(12) United States Patent
Busey

(10) Patent No.: US 7,165,213 B1
(45) Date of Patent: Jan. 16, 2007

(54) METHOD AND SYSTEM FOR COORDINATING MEDIA AND MESSAGING OPERATIONS IN AN INFORMATION PROCESSING SYSTEM

(75) Inventor: Andrew T. Busey, Austin, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/187,895

(22) Filed: Nov. 6, 1998

Related U.S. Application Data

(63) Continuation-in-part of application No. 08/768,606, filed on Dec. 18, 1996, now abandoned, which is a continuation-in-part of application No. 08/722,898, filed on Sep. 27, 1996, now Pat. No. 5,764,916.

(51) Int. Cl.
*G06F 15/00* (2006.01)
*G06F 17/00* (2006.01)

(52) U.S. Cl. .................. 715/500.1; 709/202; 709/227; 709/238

(58) Field of Classification Search ............. 707/500.1; 709/202, 227, 204, 238; 345/758, 421, 419; 715/500.1; 379/202.01
See application file for complete search history.

(56) References Cited

U.S. PATENT DOCUMENTS

| | | | |
|---|---|---|---|
| 4,837,798 A | 6/1989 | Cohen et al. | |
| 4,914,586 A | 4/1990 | Swinehart et al. | |
| 5,276,679 A | 1/1994 | McKay et al. | |
| 5,287,103 A | 2/1994 | Kasprzyk et al. | |
| 5,297,249 A | 3/1994 | Bernstein et al. | |
| 5,481,666 A | 1/1996 | Nguyen et al. | |
| 5,506,984 A | 4/1996 | Miller | |
| 5,528,671 A | 6/1996 | Ryu et al. | |
| 5,530,852 A | 6/1996 | Meske, Jr. et al. | |
| 5,537,546 A | 7/1996 | Sauter | |
| 5,539,886 A | 7/1996 | Aldred et al. | |
| 5,550,906 A | 8/1996 | Chau et al. | |
| 5,563,988 A * | 10/1996 | Maes et al. .................. | 345/421 |
| 5,572,643 A | 11/1996 | Judson | |
| 5,617,565 A | 4/1997 | Augenbraun et al. | |
| 5,619,650 A | 4/1997 | Bach et al. | |

(Continued)

FOREIGN PATENT DOCUMENTS

EP        0581722 A1       2/1994

OTHER PUBLICATIONS

McKenna, Patrick, Worlds Inc. & Diamond Multimedia To Deliver 3-D Chat, Newsbytes News Network, Dec. 13, 1995.*

(Continued)

*Primary Examiner*—William Bashore
(74) *Attorney, Agent, or Firm*—David Volejnicek

(57) ABSTRACT

A method and system for coordinating media and messaging operations in an information processing system includes the ability for streaming media and messages in an information processing system from a switching mechanism to a plurality of user nodes. The invention receives a plurality of unsynchronized media and messages from said plurality of user nodes in a synchronizer. Instructions of the present invention further control the streaming of media and messages from said switching mechanism to said plurality of user nodes using said synchronizer. Streaming media may include, for example, chat, audio and video elements, video conference transmissions, teleconference transmissions, and combinations of such media elements.

42 Claims, 15 Drawing Sheets

U.S. PATENT DOCUMENTS

| | | | |
|---|---|---|---|
| 5,668,863 A * | 9/1997 | Bieselin et al. | 379/202.01 |
| 5,737,619 A | 4/1998 | Judson | |
| 5,764,916 A * | 6/1998 | Busey et al. | 709/227 |
| 5,790,793 A | 8/1998 | Higley | |
| 5,793,365 A * | 8/1998 | Tang et al. | 345/758 |
| 5,794,006 A | 8/1998 | Sanderman | |
| 5,796,393 A | 8/1998 | MacNaughton et al. | |
| 5,828,839 A | 10/1998 | Moncreiff | |
| 5,862,230 A | 1/1999 | Darby | |
| 5,862,330 A | 1/1999 | Anupam et al. | |
| 5,880,731 A * | 3/1999 | Liles et al. | 345/758 |
| 5,884,029 A * | 3/1999 | Brush, II et al. | 709/202 |
| 5,884,032 A | 3/1999 | Bateman et al. | |
| 5,907,547 A | 5/1999 | Foladare et al. | |
| 5,956,038 A * | 9/1999 | Rekimoto | 345/419 |
| 5,966,130 A * | 10/1999 | Benman, Jr. | 345/418 |
| 5,978,835 A * | 11/1999 | Ludwig et al. | 709/204 |
| 6,031,836 A | 2/2000 | Haserodt | |
| 6,385,191 B1 | 5/2002 | Coffman et al. | |

OTHER PUBLICATIONS

Emigh, Jacqueline, Internetworld—Ziff-Davis, AOL, Others Rollout Products, Newsbytes News Network, Oct. 30, 1995, pp. 1-2.*

Emigh, Jacqueline, Executives See The Internet For 1996, Newsbytes News Network, Dec. 22, 1995, pp. 1-3.*

Mohageg, Mike et al., A User Interface for Accessing 3D Content on the World Wide Web, Conference Proceedings on Human factors in computing systems, Apr. 1996, pp. 1-10.*

Rist, Thomas et al., Adding animated presentation agents to the interface, ACM Proceedings of the 1997 international conference on Intelligent user interfaces, Jan. 6-9, 1997, pp. 79-86.*

Volano, J., "VolanoChat Java Solution Turns Ordinary Web Sites Into Interactive Money Makers", Business Wire, p8270012, Aug. 27, 1996, pp. 1-2.

Hamilton,P., "Black Sun Interactive offers free VRML browser for real-time 3d multi-user interaction of the Internet; Leading cyberspace technology developer to offer viewer, server and builder product set for Internet and Intranet virtual worlds", Business Wire, p02120140, Feb. 12, 1996, pp. 1-3.

Mustang Software, "BBS Out Of The Gate: Wildcat 5 features HTML interface, realtime chat—Mustang, Seeking VARs, Launches Program", Computer Reseller News, P111, Apr. 1, 1996, p. 1.

Moeller, M., "Sun is working on rebuilt HotJava as hosting environment. (Browsers Take New Turn (Sun Microsystems) (Product Development)", PC Week, v13, n9, Mar. 4, 1996, pp. 1-2.

Hirshon, J., "WebMaster Announces First IRC Server Software for Windows NT-based Intranet; ConferenceRoom for Window NT Available at $249 Per Sever; Fully Supports Web and Intranet Applications Through International Standards, Plus Multimedia Functionality, OLE, Java, and Web Browser Support", Business Wire, p03270249, Mar. 27, 1996, pp. 1-2.

Amdur, D., "Virtually Speaking", Multimedia World, p. 114, Mar. 1996.

Conatser, L., "RoundTable bring Web chat, file sharing to file", InfoWorld, p. 3-4, Aug. 5, 1996.

Conatser, K., "VolcanoChat is simple way to add interactivity", InfoWorld, p. 12., Oct. 28, 1996.

Conatser, K., "WebBoard builds powerful on-line forums effortlessly", InfoWorld, p. 4-5, May 13, 1996.

Desmond, M., "The shape of Things to come: Alpha world Brings a 3-D Virtual World to the Internet," Multimedia World, p. 16-17, Sep. 1995.

Hill, J., "Tribal voice: PowWow", PC Magazine, p. 118, Oct. 8, 1996.

Jones, C., "Audio goes live on Web", InfoWorld, p. 15-16, Sep. 28, 1996.

Kramer, M., "Neat ways to meet on the Net", PC Week, p. 82, Apr. 15, 1996.

Kramer, M., "Web heeds conference call", PC Week: PC Weeklabs Reviews, p. 59, Feb. 26, 1996.

Metz, E., "Java, Jfactory, and Network Development", Dr. Dobb's Journal, p. 78-87, Sep. 1996.

Miller, M.J., "Being Virtual", PC Maganize, p. 29, Feb. 6, 1996.

Pearlstein, J., "Serving up real-time Chat", Gateways, Jun. 3, 1996.

Pearlstein, J., "Tapestry Eases HTML", Gateways, p. 20, Jun. 17, 1996.

Seminerio, M., "eShare Chats Up Intranets With Expressions Software", PC Week, p. 33, Feb. 24, 1997.

Serrat, E.M., "A NetWare Chat Utility", Dr. Dobb's Journal, 7 pages, Nov. 1993.

Staten, J., "Internet to get chattier", Gateways, p. 28, Aug. 7, 1995.

Thomas, R., "On-Line Conferencing and Reader Responses", UnixWorld, p. 111-113, Jan. 1989.

Tweney, D., "Best Online Services", PC World, p. 153-162, Aug. 1996.

Welch, N., "Custom Forums let users meet on-line", Gateways, p. 15, Nov. 19, 1991.

Zimmerman, M.R., "OnLive software lets users converse over the Internet," PC Week, p. 14, Sep. 30, 1996.

"Travlang Chat,"<http://chat.travlang.com/>, 1995-1998 Travlang.

"Chat," WBS,<http://wbs.net/wcc.html>,WebChat Communications, Inc., 1995-1998.

"Tennis Chat," WebChat™, Internet Roundtable Society, JJ Unlimited, <http://www.tennisoucntry.com/chat.html>,1995.

Busey, A., "The Other Side of Muds," Secrets of the Mud Wizards, Chapter 12 p. 215-433, Sama.net Publishing, 1995.

Orman, N., "Upstart tech firm inks huge deal", Yahoo! for ichat, 1 page, Jan. 17-23, 1997, Austin Business Journal, vol. 16, No. 47.

Ramo, J., "Winner Take All", 8 pp., Business, Sep. 16, 1996, Time Magazine.

Frentzen, J., "Real-time Internet conferencing Takes Off," PCWEEK, Feb. 20, 1995, v12, No. 7, p. 18, (Computer Select CD, Dec. 1995).

Constance, P., "Interlink posts intelligence data on the Web for 100,000 curious surfers," Government Computer News, May 27, 1996, v15, No. 11, p. 60. (Computer Select CD, Dec. 1996).

"Choose your topology", Release 1.0, Jun. 23, 1995, v95, No. 6, p. 15, (Computer Select CD, Dec. 1995).

"Look who's talking", Computer Letter, Jul. 29, 1996, vol. 12, No. 25, p. 1 (computer Select CD, Dec. 1996).

Blair, D., "MaxWeb 2.0: Interactive 3D Cinema on the World Wide Web", USENET posting Apr. 3, 1995, Internet-www.google.com/groups.

MIRC v.3.7 "Versions.txt"(Dec. 10, 1995) -retrieved from www.mirc.org.

Progressive Networks, Inc., "RealVideo Technical White Paper", 7 pages, Mar. 16, 1997, http://www.real.com/products/realvideo/overview/index.html.

\* cited by examiner

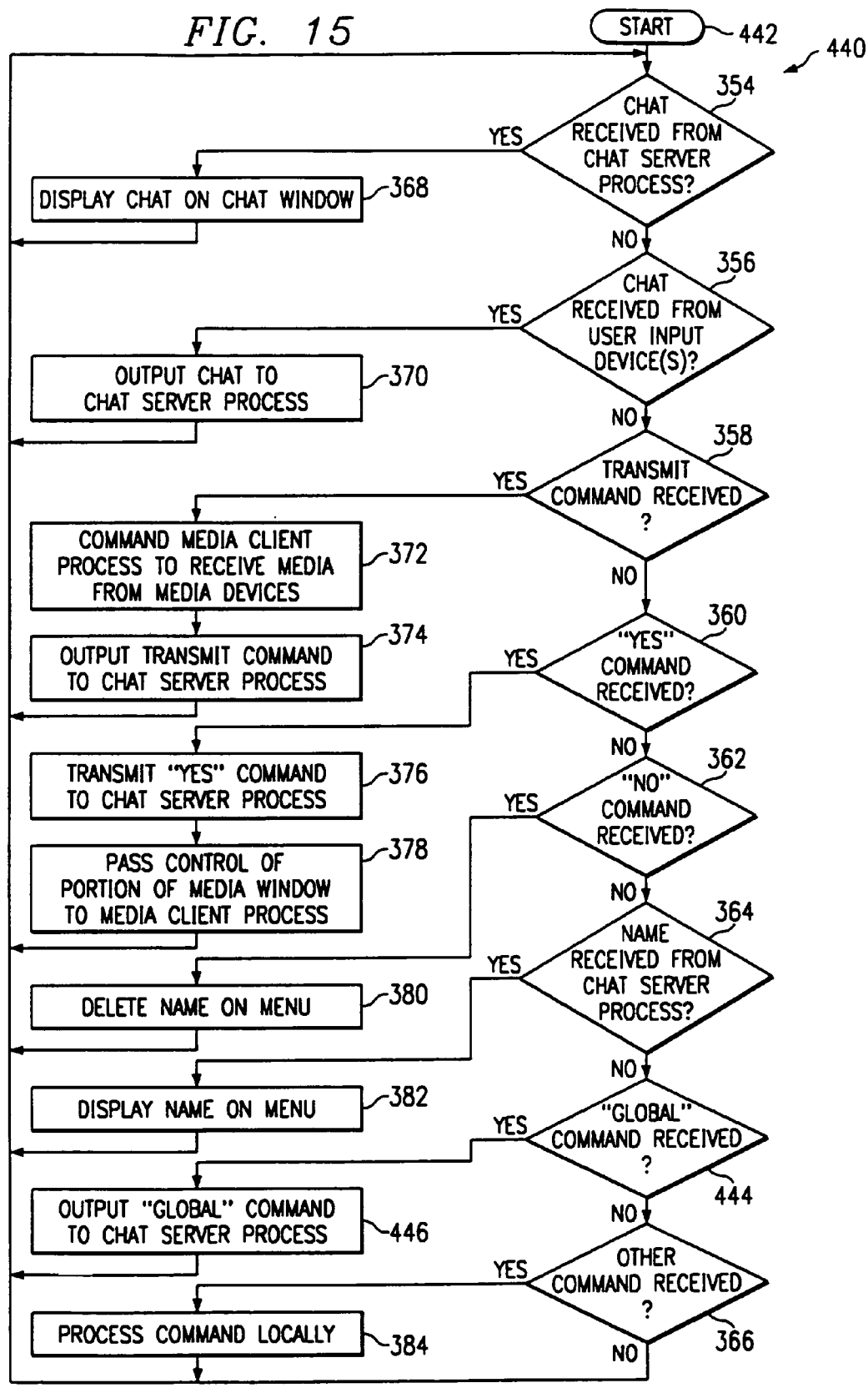

METHOD AND SYSTEM FOR COORDINATING MEDIA AND MESSAGING OPERATIONS IN AN INFORMATION PROCESSING SYSTEM

This patent application is a continuation-in-part of coassigned U.S. patent application Ser. No. 08/768,606, filed Dec. 18, 1996, now abandoned, which is a continuation-in-part of coassigned U.S. patent application Ser. No. 08/722,898, filed Sep. 27, 1996, now U.S. Pat. No. 5,764,916.

TECHNICAL FIELD OF THE INVENTION

This patent application relates in general to information processing systems and in particular to a method and system for coordinating media and chat operations in an information processing system.

BACKGROUND OF THE INVENTION

The Internet has experienced rapid user-based growth in business, home applications, and educational institutions and has received a vast set of content sources for the communication of a wide variety of media to its users. Technological evolution in streaming media has played an important part in both the attractiveness and versatility of the Web-based media applications. With previous techniques, computers have executed chat processes, Web browser processes, and media processes substantially independently of one another, so that coordination between chat operations, Web browser operations, and media operations rely extensively upon user requests at various points in time. In this manner, such processes are generally uncoordinated, and extensive reliance upon user requests for coordination is inconvenient.

Accordingly, a need has arisen for a method and system for coordinating media and chat operations in an information processing system, in which chat operations, Web browser operations, and media operations are more coordinated relative to previous techniques, and in which such coordination is less reliant upon user requests relative to previous techniques.

SUMMARY OF THE INVENTION

The present invention provides a method and system for coordinating media and messaging operations in an information processing systems that overcomes the limitations of previously uncoordinated methods of delivery.

According to one aspect of the present invention, there is provided a method and system for coordinating media and messaging operations in an information processing system which includes the ability for streaming media and messages in an information processing system from a switching mechanism to a plurality of user nodes. The invention receives a plurality of unsynchronized media and messages from said plurality of user nodes in a synchronizer. Instructions of the present invention further control the streaming of media and messages from said switching mechanism to said plurality of user nodes using said synchronizer. Streaming media may include, for example, chat, audio and video elements, video conference transmissions, teleconference transmissions, and other combinations of media elements.

It is a technical advantage that chat operations and media operations are more coordinated relative to previous techniques.

It is another technical advantage that such coordination is less reliant upon user requests relative to previous techniques.

BRIEF DESCRIPTION OF THE DRAWING

An illustrative embodiment and its advantages are better understood by referring to the following descriptions and accompanying drawing, in which:

FIG. 15 provides a logic flow diagram for a process similar to that of FIG. 10;

DETAILED DESCRIPTION OF THE INVENTION

An illustrative embodiment and its advantages are better understood by referring to FIGS. 1–17 and the following associated text.

Figure 1:
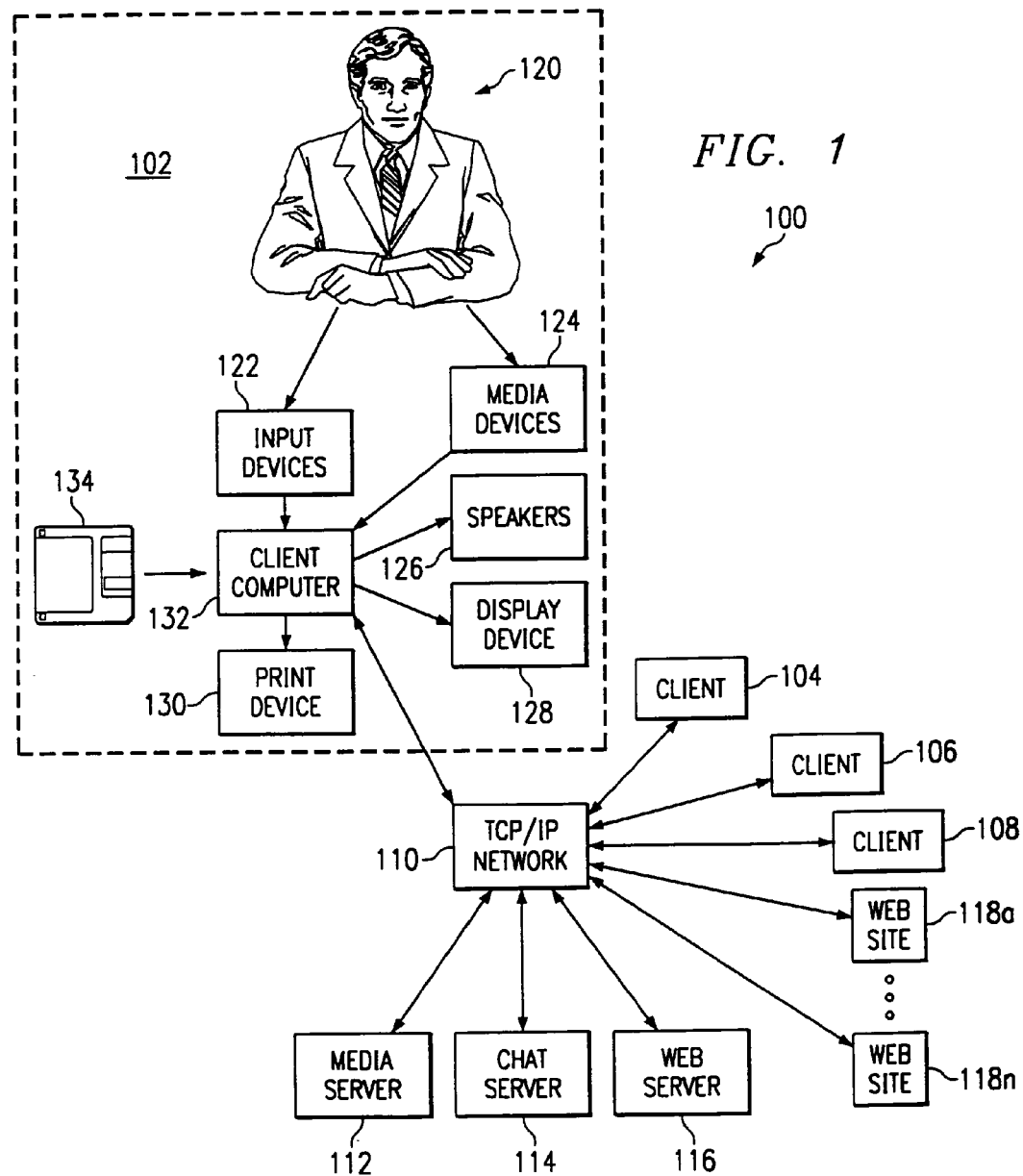
FIG. 1 provides a block diagram of a coordinating system according to the illustrative embodiment.

FIG. 1 is a block diagram of a system, indicated generally at 100, according to the illustrative embodiment. Coordinating system 100 includes clients 102, 104, 106 and 108, each for executing a respective client process. Further, coordinating system 100 includes transmission control protocol/internet protocol ("TCP/IP") network 110 for communicating with external communication equipment, media server computer 112 for executing a media server process, and communicating media information (e.g. real time continuously streaming video, real time continuously streaming audio, still photograph) in response thereto, chat server computer 114 for supporting a chat server process, and a Web server computer 116 for supporting a Web server process. Web server 116 connects to multiple Web site computers 118a through 118n. Accordingly, each of clients 102, 104, 106 and 108, network 110, server 112, server 114, server 116 and Web site computers 118a through 118n includes a respective computer for supporting respective processes and performing respective operations.

Also, as shown in FIG. 1, each of servers 112, 114 and 116 couples through network 110 to each of clients 102, 104, 106 and 108. Through TCP/IP network 110, information flows between servers 112, 114 and 116, and clients 102, 104, 106 and 108. Clients 102, 104, 106 and 108 are substantially identical to one another, and client 102 is a representative one of clients 102, 104, 106 and 108.

Client 102 includes human user 120, input devices 122, media devices 124, speakers 126, display device 128, print device 130 and client computer 132. Client computer 132 connects to input devices 122, media devices 124, speakers 126, display device 128 and print device 130. Display device may be, for example, a conventional electronic cathode ray tube display. Print device 130 may be, for example, a conventional electronic printer or plotter.

Moreover, client 102 includes computer-readable medium (or device) 134, such as a floppy computer diskette or a computer hard drive. Computer-readable medium 134 and client computer 132 structurally and functionally interrelate with one another. Each computer of the illustrative embodiment structurally and functionally interrelates with a respective computer-readable medium, similar to the manner in which client computer 132 structurally and functionally interrelates with computer-readable medium 134. Computer-readable medium 134 represents one of such computer-readable media.

Computer-readable medium 134 stores (or encodes, or records, or embodies) functional descriptive material (e.g., computer programs and/or computer applications, and data structures). Such functional descriptive material imparts functionality when encoded on computer-readable medium 134. Also, such functional descriptive material structurally and functionally interrelates to computer-readable medium 134.

Within such functional descriptive material, data structures define structural and functional interrelationships between such data structures and computer-readable medium 134 (and other aspects of coordinating system 100). Such interrelationships permit realizing functionality of the data structures. Also, within such functional descriptive material, computer programs define structural and functional interrelationships between such computer programs and computer-readable medium 134 (and other aspects of coordinating system 100). Such interrelationships permit realizing the computer programs' functionality.

For example, client computer 132 reads (or accesses, or copies) such functional descriptive material into a computer memory of client computer 132, and client computer 132 performs its operations (as described elsewhere herein) in response to such material which is stored in such computer memory. More particularly, client computer 132 performs the operation of processing a computer application (that is stored, encoded, recorded or embodied on a computer-readable medium) for causing client computer 132 to perform additional operations (as described elsewhere herein). Accordingly, such functional descriptive material exhibits a functional interrelationship with the way in which client computer 132 executes its processes and performs its operations.

Further, the computer-readable medium is an apparatus from which the computer application is accessible by client computer 132, and the computer application is processable by client computer 132 for causing client computer 132 to perform such additional operations. In addition to reading such functional descriptive material from computer-readable medium 134, client computer 132 is capable of reading such functional descriptive material from (or through) network 110 which is also a computer-readable medium (or apparatus). Moreover, the computer memory is itself a computer-readable medium (or apparatus).

User 120 and client computer 132 operate in association with one another. For example, in response to signals from client computer 132, display device 128 displays visual images, and user 120 views such visual images. Also, in response to signals from client computer 132, print device 130 prints visual images on paper, and user 120 views such visual images. Further, in response to signals from client computer 132, speakers 126 output audio frequencies, and user 120 listens to such audio frequencies. Moreover, user 120 operates input devices 122 and media devices 124 in order to output information to client computer 132, and client computer 132 receives such information from input devices 122 and media devices 124.

Input devices 122 include, for example, a conventional electronic keyboard and a pointing device such as a conventional electronic "mouse", rollerball or light pen. User 120 operates the keyboard to output alphanumeric text information to client computer 132, and client computer 132 receives such alphanumeric text information from the keyboard. User 120 operates the pointing device to output cursor-control information to client computer 132, and client computer 132 receives such cursor-control information from the pointing device.

User 120 operates media devices 124 in order to output information to client computer 132 in the form of media signals, and client computer 132 receives such media signals from media devices 124. Media signals include, for example, video signals and audio signals. Media devices 124 include, for example, a microphone, a video camera, a videocassette player, a CD-ROM (compact disc, read-only memory) player, and an electronic scanner device.

User 120 operates the microphone to translate audio frequencies from a surrounding environment into electronic audio signals, and user 120 operates client computer 132 to receive such audio signals from the microphone. Also, user 120 operates the video camera to translate visual images from the surrounding environment into electronic video signals, and user 120 operates client computer 132 to receive such video signals from the video camera. Further, user 120 operates the videocassette player to translate information from a videocassette tape media into electronic video signals and audio signals, and user 120 operates client computer 132 to receive such video signals and audio signals from the videocassette player. Moreover, user 120 operates the CD-ROM player to translate information from a CD media into electronic video signals and audio signals, and user 120 operates client computer 132 to receive such video signals and audio signals from the CD-ROM player. In addition, user 120 operates the scanner device to translate visual images from a piece of paper into electronic video signals, and user 120 operates client computer 132 to receive such video signals from the scanner device.

Although FIG. 1 shows only four clients (i.e. clients 102, 104, 106 and 108), it should be understood that other clients (substantially identical to clients 102, 104, 106 and/or 108) are connected to network 110. Each of the clients is associated with a respective user and has a respective client computer and a respective set of associated devices, similar to the manner in which client 102 is associated with user 120 and has its respective client computer 132 and respective set of associated devices (i.e. input devices 122, media devices 124, speakers 126, display device 128, print device 130 and computer-readable medium 134).

The internet operates according to a system of protocols for transferring information between a host computer (or "server" or "Web site"), such as any of Web site computers 118*a* through 118*n*, and a user's computer (or "client"), such as any of clients 102, 104, 106 and 108 and other clients connected to network 110. Accordingly, in the illustrative embodiment, coordinating system 100 is a global computer network. Chat server 114 is capable of executing multiple server processes, such as an HTTP server process, a Telnet/chat server process, an FTP server process, an internet Relay Chat ("IRC") server process, Gopher, Usenet and WAIS.

Figure 2:
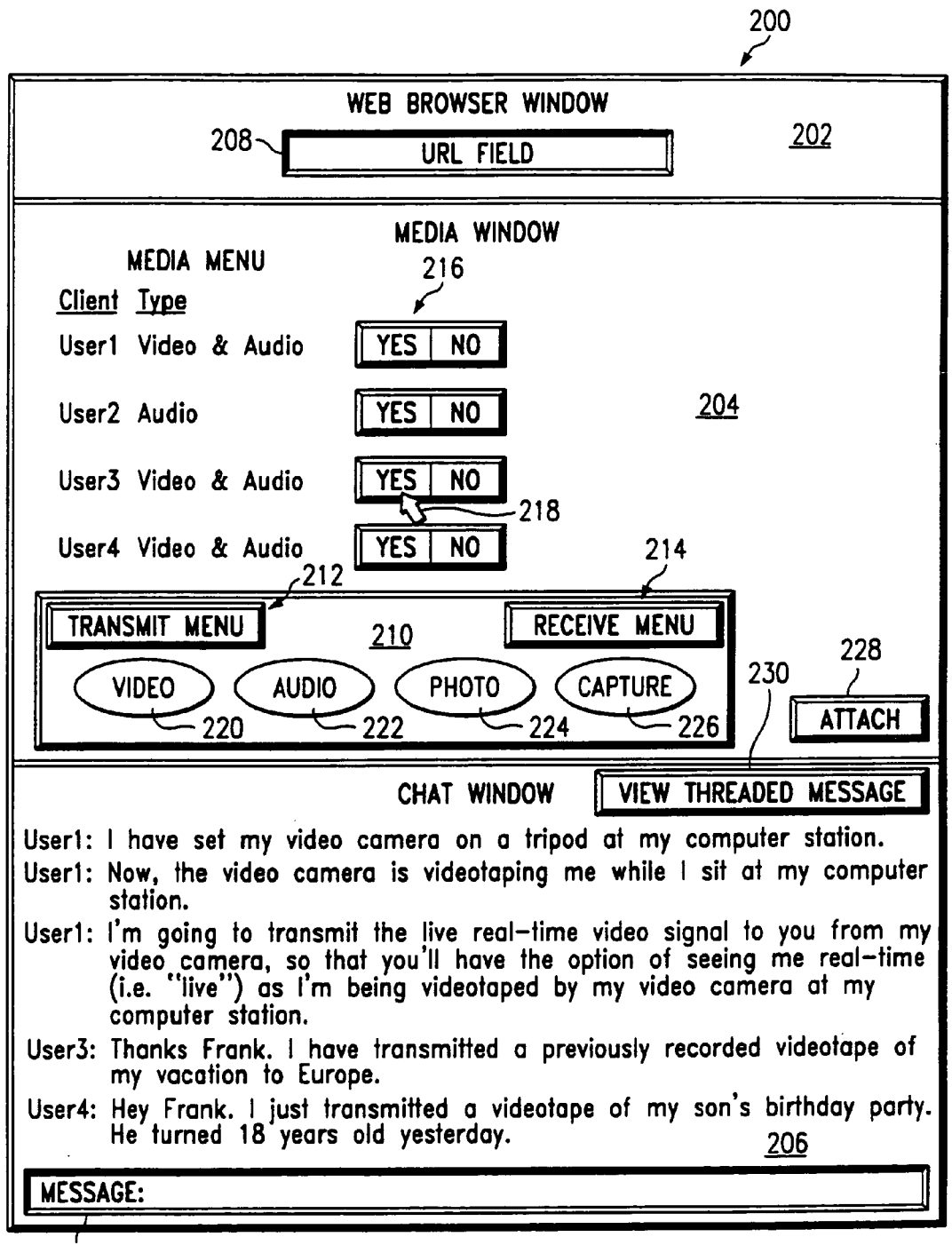
FIG. 2 shows a first screen displayed by a display device using the system of FIG. 1.

FIG. 2 shows visual image (or "screen") 200, such as may be displayed by display device 128 in response to signals from client computer 132. As previously mentioned hereinabove in connection with FIG. 1, servers 112, 114 and 116, and clients 102, 104, 106 and 108 communicate information to one another through TCP/IP network 110. Accordingly, screen 200 includes a Web browser window 202, a media window 204, and a window which, initially, may be a chat window 206. In the illustrative embodiment, chat window 206 functions within Web browser window 202, while media window 204 functions in chat window 206. In the following discussion, any information described as being displayed in chat window 206 could (in alternative embodiments) be displayed in media window 204.

Web browser window 202 includes URL field 208 for displaying an address of a Web site. User 120 may specify the address by operating input devices 122. In response to the specified address, client computer 132 outputs signals to display device 128, so that the address is displayed within URL field 208. Moreover, in response to the specified address, client computer 132 outputs information (e.g., the specified address) to Web server 116 through TCP/IP network 110.

In response to such information from client computer 132, Web server 116 initiates communication with a selected one of Web sites 118*a* through 118*n* associated with the specified address. Also, Web server 116 outputs information (e.g., information from the selected Web site) to client computer 132 through TCP/IP network 110. In response to such information from Web server 116, client computer 132 outputs signals to display device 128, so that such information is displayed within Web browser window 202. If such information is from one of Web sites 118*a* through 118*n* associated with an address different from the specified address from user 120, then Web server 116 outputs the different address to client computer 132, so that the different address is displayed within URL field 208. For clarity, such information from one of Web sites 118*a* through 118*n* is not shown in Web browser window 202, but an example of such information may appear as HTML pages 410, 420, 440, 446, 450, 456, 460, 466, 470, 476, 480 and 486 in FIGS. 4A–J of co-assigned co-pending U.S. patent application Ser. No. 08/768,606, filed Dec. 18, 1996.

Media window 204 includes transmit/receive window 210 for displaying transmit menu 212 and receive menu button 214, as well as a media menu, indicated generally at 216. Accordingly, transmit/receive window 210 initially displays four "buttons" which are individually selectable by user 120 operating the pointing device of input devices 122, for example, to position cursor 218 overlapping with one of such buttons and activating a switch of the pointing device. As shown in FIG. 2, the four buttons of the transmit menu are video button 220, audio button 222, photo button 224, and capture button 226. Also, media window 204 includes attach button 228.

Chat window 206 includes view threaded message button 230. Further, chat window 206 includes message field 232 for displaying information (e.g., a "message") that user 120 specifies, for example, by operating an electronic keyboard of input devices 122. With the exception of information displayed in message field 232, chat window 206 is identically displayed to all enabled users who have joined a particular chat or "message session". For example, the respective user of each of clients 104, 106 and 108 may be enabled, such that the respective chat window viewed by each of such users through his or her respective associated display device is the same (i.e., displays the same information), except for information displayed in the each such user's respective message field. Also, in such a situation, each enabled user's respective Web browser window 202 is not necessarily the same as that of all other enabled users. Moreover, in a significant aspect of the illustrative embodiment, the media window displayed to each enabled user is not necessarily the same as that of all other enabled users.

Coordinating system 100 enables the moderator or leader of a group chat session to control the media windows and Web browser windows of clients individually or collectively for the group. For example, coordinating system 100 enables the moderator to show media or Web pages to a user individually or to multiple users collectively as a group. Also, coordinating system 100 enables the moderator to discuss such media or Web pages with such users 120 in the chat windows 206 respectively associated with such user(s). Moreover, coordinating system 100 enables the moderator to control the chat windows of clients individually or collectively as a group, as, for example, by specifying that a client continue a present message session or join a different message session (e.g., a different message session associated with a different Web page), or by suggesting that a client join a different message session.

In the example of FIG. 2, user 120 is named "User1", and User1 has operated the electronic keyboard of input devices 122 to type and output (hereinafter referred to as "type" or "typed" or "typing") three chat messages, as shown in FIG. 2, to all enabled users who have joined the particular message session. Also, in FIG. 2, User1 may operate pointing device of input devices 122 to position cursor 218.*to* overlap video button 220 of transmit/receive window 210 and has activated the switch of the pointing device (hereinafter referred to as "click" or "clicked" or "clicking").

By doing so, User1 causes client computer 132 to receive real time continuously streaming video signals and real time continuously streaming audio signals from the video camera and microphone of media devices 124. Alternatively, User1 may cause client computer 132 to receive continuously streaming video signals and continuously streaming audio signals from the video cassette player of media devices. In response to a suitable request by User1, client computer 132 translates such signals into digital information and outputs such digital information to display device 128, so that User1 is free to view the visual images represented by such signals, as well as to speakers 126, so that User1 is free to hear audio frequencies represented by such signals. In response to a suitable request that may be output to media server 112 through TCP/IP network 110 by another client, media server 112 outputs a request to client computer 132, for example, through TCP/IP network 110. In response to such a request from media server 112, client computer 132 translates the signals from media devices 124 into digital information and outputs such digital information to media server 112 through TCP/IP network 110 and ultimately to the requesting client for display on such client's associated display device and for output on such client's associated speakers.

Similarly, User1 may transmit audio only (i.e., audio without accompanying video) by clicking on (or "selecting") audio button 222 within transmit/receive window 210. Also, User1 is able to transmit a still photograph by clicking on photo button 224 within transmit/receive window 210.

In response to User1's "clicking" on video button 220, the video button 220 is surrounded by two curves instead of a single curve, and media menu 216 and respective media menus of other enabled clients of coordinating system 100 display User1's name, along with an indication that User1 has transmitted "video & audio". Likewise, media menu 216 displays the names of other enabled users (e.g., User2, User3 and User4) who have operated their respective transmit menus to transmit various types of media, as shown in FIG. 2. For example, client 104 is associated with User2, client 106 is associated with User3, and client 108 is associated with User4. Likewise, although FIG. 1 shows only four clients (i.e., clients 102, 104, 106 and 108, it should be understood that other clients substantially identical to clients 102, 104, 106 and/or 108 connect to network 110. Therefore, other enabled users associated with such other clients may join the particular message session.

As shown in FIG. 2, User2 may transmit audio, as "indicated by the "audio" designation adjacent to User2 in media menu 216. User3 and User4 have transmitted respective video & audio, as indicated by the "video and audio" designations adjacent to their names in media menu 216. Accordingly, the sources of the various media transmissions listed in media menu 216 are the clients associated with various enabled users of coordinating system 100. The enabled users communicate with one another by typing messages as shown in chat window 206. In that manner, each enabled user, who has joined the particular message session, is able to tell the other enabled users about the contents of transmissions, which may be identified in media menu 216, without such other enabled users necessarily having to view or hear such transmissions.

Even if a particular enabled user has not yet transmitted media, or has not yet typed a chat message, such user is nevertheless able to view the communicated chat messages in his/her associated chat window and the list of available media transmissions in his/her associated media menu 216 by viewing his/her associated display device connected to his/her associated client computer.

Media window 204 displays media to User1. In a significant aspect of the illustrative embodiment, User1 may select (for viewing and/or listening) any of the media transmissions listed in media menu 216, by clicking on the "YES" button adjacent to such media transmission's listing. Moreover, User1 may reject any of such media transmissions by clicking on the "NO" button adjacent to such media transmission's listing, so that such rejected media transmission is no longer listed in media menu 216.

As shown in FIG. 2, User1 may select User3's continuously streaming video & audio transmission (originating from a videocassette player of User3's associated media devices) by clicking on the "YES" button adjacent to User3's listing in media menu In response to User1's selection, client computer 132 outputs to media server 112 through TCP/IP network 110 a request for User3's media transmission. In response to such request, media server 112 and client 106 associated with User3 output User3's media transmission to client computer 132 for display on display device 128 and for output on speakers 126.

Figure 3:
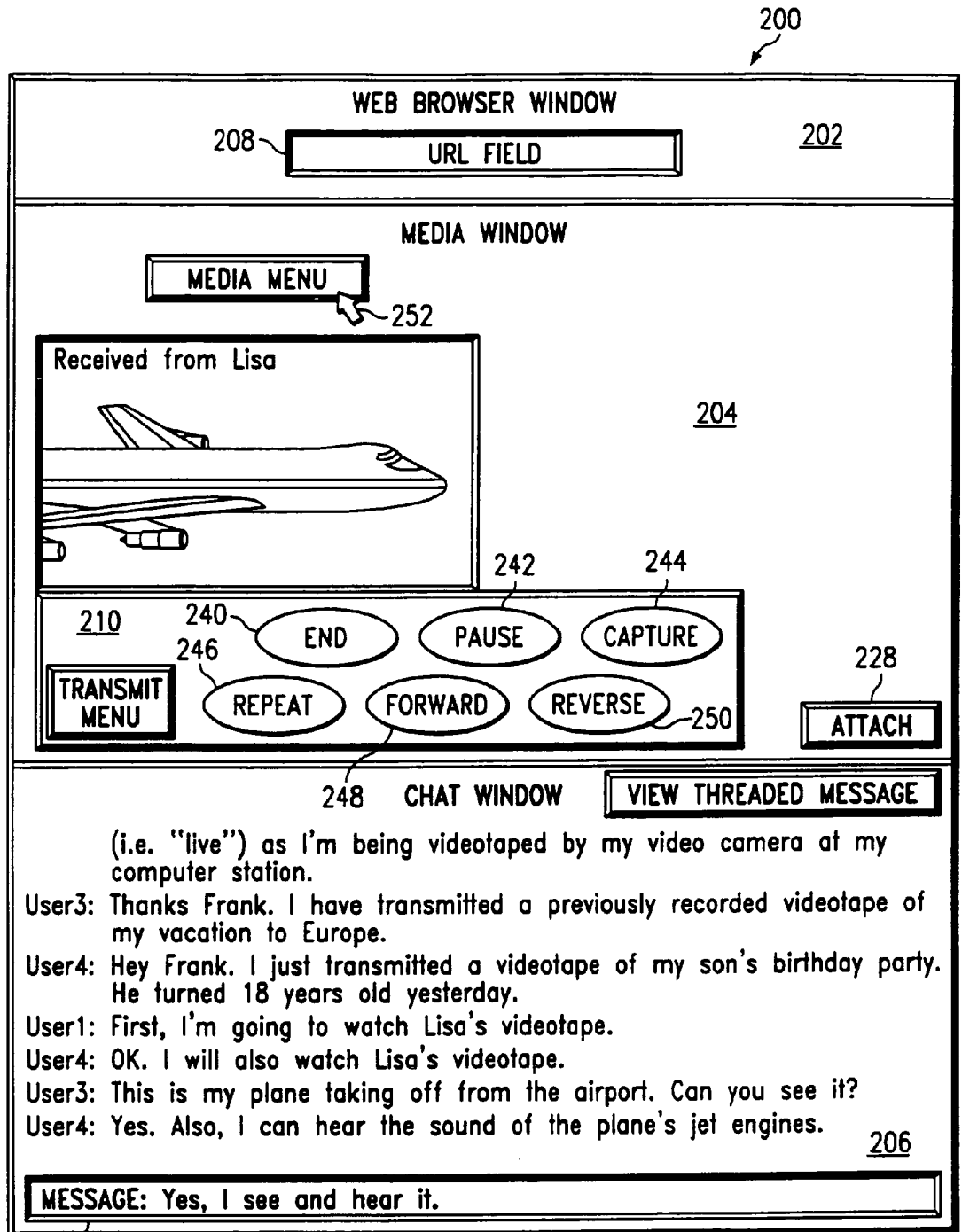
FIG. 3 shows a second screen displayed by a monitor associated with the system of FIG. 1.

Accordingly, in FIG. 3, media window 204 displays User3's media transmission, along with an indication that such media transmission is received from User3. Notably, when media window 204 begins displaying User3's media transmission, transmit/receive window 210 displays a "receive menu" instead of the "transmit menu", although transmit/receive window 210 displays a "transmit menu" button, and media window 204 no longer displays media menu 216. The "receive menu" includes "End" button 240, "Pause" button 242, "Capture" button 244, "Repeat" button 246, "Forward" button 248, and "Reverse" button 250.

By clicking on End button 240, User1 causes client 102 to stop its receipt and output (e.g., the displaying on media window 204 and the outputting on speakers 126) of the most recently selected media transmission. By clicking on the Pause button 242, User1 causes client 102 to stop updating or freeze its receipt and output of the most recently selected media transmission. By clicking on Capture button 244, User1 causes client computer 132 to capture and store the most recently selected media transmission. By clicking on Repeat button 246, User1 causes client 102 to repeat the output of the previously captured-and-stored media transmission from its beginning to its end.

By clicking on Forward button 248, User1 causes client 102 to accelerate the output (e.g., resulting in updating of the display on media window 204 and the output on speakers 126) of the most recently selected media transmission, similar to the manner in which a "forward" button would function on a videocassette player. Accordingly, Forward button 248 does Not apply to real time or "live" media transmissions. By clicking on Reverse button 250, User1 causes client 102 to reverse the output of the most recently selected media transmission, similar to the manner in which a "reverse" button would function on a videocassette player.

Figure 4:
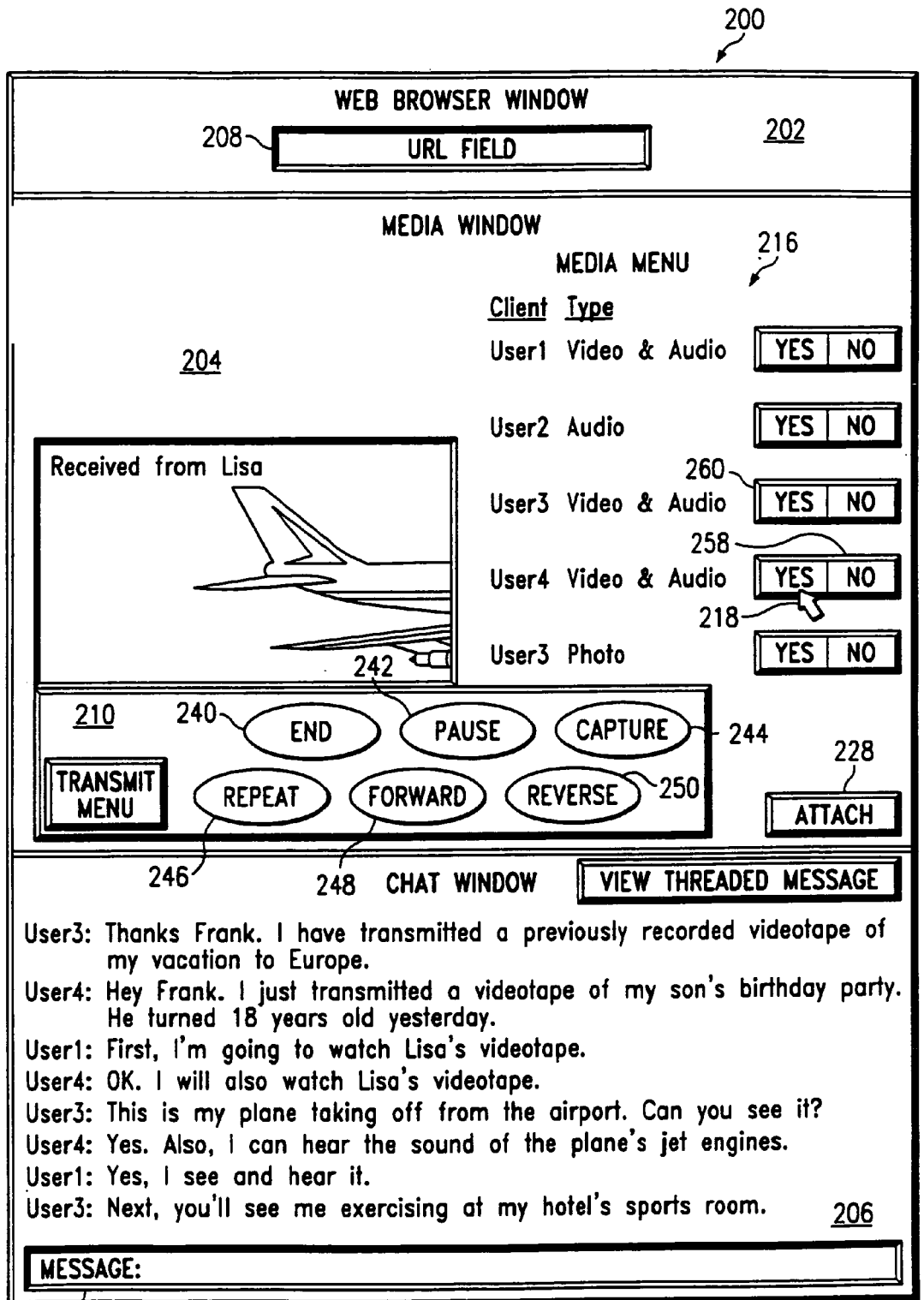
FIG. 4 depicts a third screen displayed by a display device of the system of FIG. 1.

As shown in FIG. 3, User1 may type a chat message. Although the chat message (typed by User1) may be only a single line in length, User1 may type a longer chat message, causing chat window 206 to display the longer chat message by scrolling it on a line-by-line basis. Also, User1 may click on "Media Menu" button 252, causing media menu 216 to be displayed again within media window 204. Also, as shown in FIG. 4, User1 may select User4's video & audio transmission by clicking on the "YES" button adjacent to User4's listing in media menu 216 (FIG. 2). Accordingly, media window 204 will display User4's media transmission, along with an indication that such media transmission is received from User4.

Notably, media window 204 FIG. 2 displays User4's media transmission partially overlapping User3's media transmission, because User1 selected User4's media transmission more recently than User3's media transmission. Also, when media window 204 begins displaying User4's media transmission, media window 204 no longer displays media menu 216. In media window 204, User1 clicks on User4's media transmission within media window 204 and, while continuing to activate the switch of the pointing device, User1 relocates User4's media transmission within media window 204. In a similar manner, User1 can relocate any window within screen 200.

Media window 204 may display User4's media transmission in a different location within media window 204. Also, User1 may click on "End" button 240, so that media window 204 stops displaying User4's media transmission.

In the operation of the present invention, User1 may type a chat message. Also, User1 may click on "Media Menu"

button 252, so that media menu 216 appears again within media window 204. Also, User1 may select a separate video & audio transmission by clicking on "YES" button, adjacent to User1's listing in media menu 216. In response to User1's selection, media window 204 displays User1's media transmission, along with an indication that such media transmission is received from User1.

User1 may click on "Pause" button 242, so that media window 204 stops updating (i.e., freezes) its display of User1's media transmission. Also, User1 may type a chat message. In response to User1 clicking on "Pause" button 242, "Pause" button changes into a "Resume" button (Not shown). By clicking on "Resume" button 242, User1 causes client 102 to resume updating (i.e., stop freezing) its receipt and output of User1's media transmission.

User1 may click on User3's media transmission within media window 204, so that User3's media transmission is the most recently selected media transmission. Accordingly, media window 204 may display User3's media transmission partially overlapping User1's media transmission, because User1 selected User3's media transmission more recently than his own media transmission. Moreover, in response to User1 clicking on User3's media transmission, the "Resume" button changes back into "Pause" button 242, because User1 has Not paused User3's media transmission, which is the most recently selected media transmission.

User1 may click on "Capture" button 244, so that client computer 132 captures and stores User3's media transmission. By clicking on "Repeat" button 246, User1 causes client computer 132 to repeat the display on media window 204 of such captured-and-stored media transmission from the beginning of such capture to the end of such capture. Accordingly, in response to User1's clicking on the "Capture" button 244, "Capture" button 244 becomes surrounded by two curves, instead of a single curve.

User1 may click again on "Capture" button 244, thereby causing client computer 132 to end its capturing and storing of User3's media transmission. In response to User1's clicking again on "Capture" button 244, "Capture" button 244 becomes surrounded by a single curve, instead of two curves. Also, User1 may click on "End" button 240, so that media window 204 stops displaying User3's media transmission.

Figure 5:
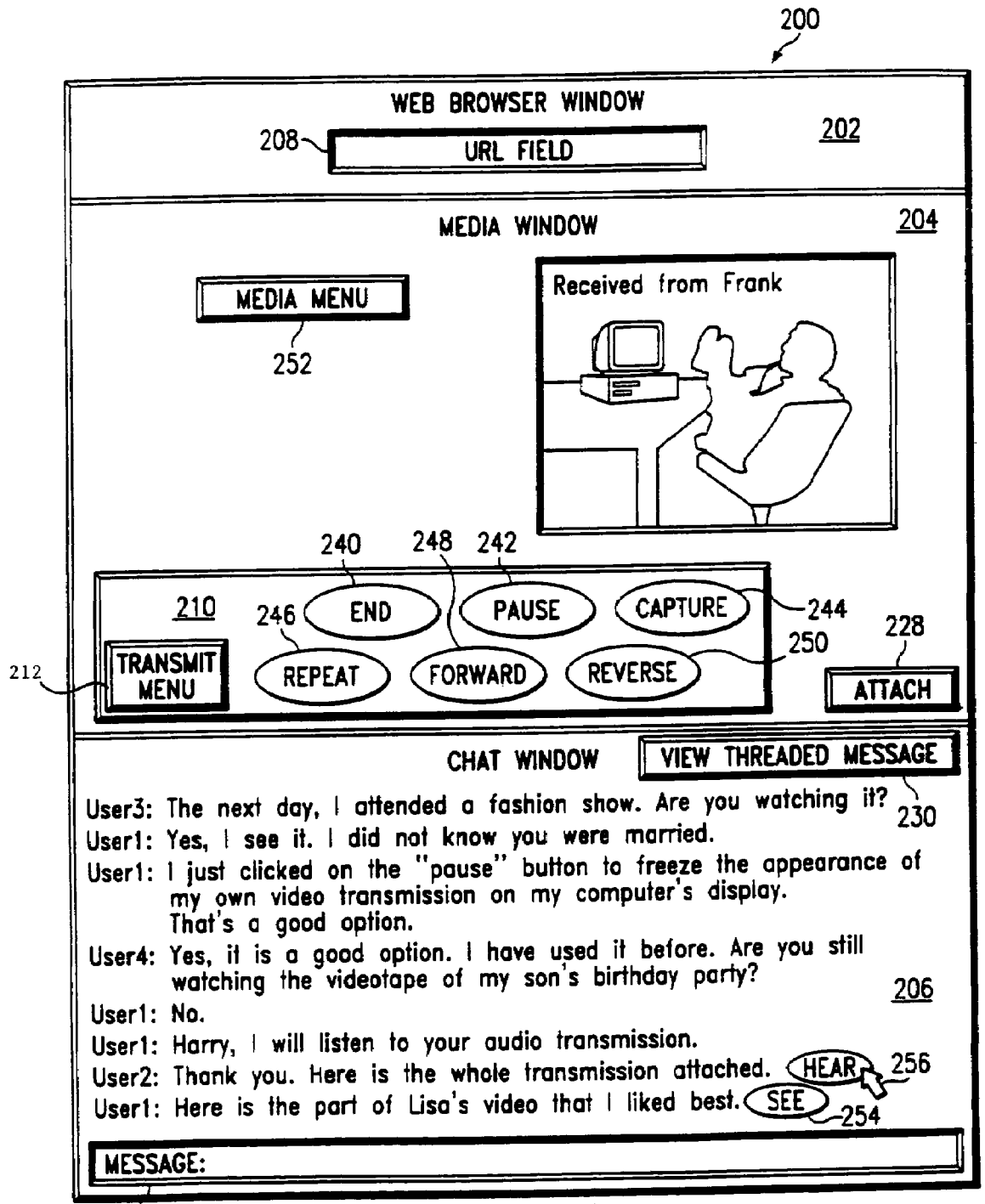
FIG. 5 provides a fourth screen displayed by a display device of the system of FIG. 1.

As shown in FIG. 5, chat window 206 may display a chat message from User2 with an adjacent "hear" button 256. Also, User1 may type a chat message and click on "Attach" button 228. In response to clicking on "Attach" button 228, through TCP/IP network 110 client computer 132 outputs the chat message to chat server 114 and other enabled clients of coordinating system 100 and the captured-and-stored media transmission from the beginning of such capture to the end of such capture. Accordingly, User3's previous media transmission that was captured and stored to media server 112 is provided to other enabled clients of coordinating system 100.

When User1's chat message is displayed in chat window 206 and in the chat windows respectively associated with such other enabled clients, User1s chat message may be displayed with an adjacent "see" button 254, in the same manner as User2's chat message is displayed in chat window 206 with adjacent "hear" button 256.

User1 may click on "hear" button 256 adjacent to User2's chat message in chat window 206. In response to User1's clicking on "hear" button 256, media server 112 and client 104 associated with User2 will output User2's media transmission to client computer 132. Client computer 132 will translate the digital information of such media transmission into signals and output such signals to speakers 126. This makes User1 free to hear audio frequencies represented by such signals.

Figure 6:
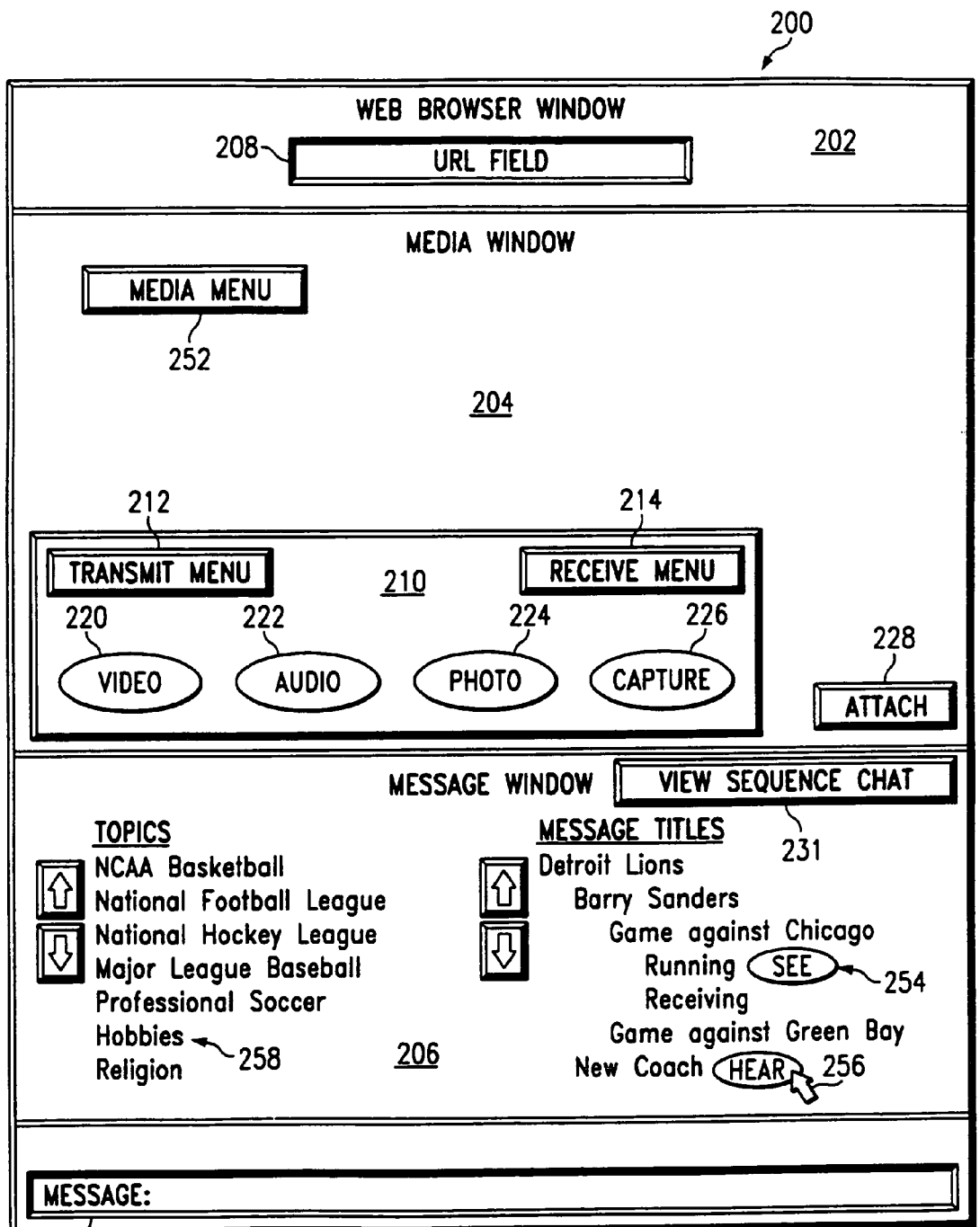
FIG. 6 shows a fifth screen displayed by a display device of the system of FIG. 1.

User1 may click on "Media Menu" button 252, so that media menu 216 displays again within media window 204 FIG. 6. Also, User1 may reject User4's media transmission by clicking on "NO" button 258 adjacent to the listing of User4's media transmission FIG. 4. This causes User4's media transmission to no longer be listed in media menu 216. Further, User1 may type a chat message. Similarly, User1 may reject User3's media transmission by clicking on "NO" button adjacent to the listing of User3's media transmission, causing User3's media transmission to no longer be listed in media menu 216.

User1 may click on "End" button 240, causing client 102 to stop its receipt and output of User2's media transmission. User1 may also click on "see" button 254 adjacent to User1's chat message in chat window 206. In response to User1's clicking on "see" button 254, client computer 132 outputs User1's captured-and-stored media transmission from the beginning of such capture to the end of such capture. Accordingly, User3's previous media transmission will be captured and stored to display device 128 and speakers 126. Media window 204, therefore, will display User1's captured-and-stored media transmission along with an indication that such media transmission is received from User1.

User1 may also click on User1's first media transmission within media window 204, so that User1's first media transmission is the most recently selected media transmission. Therefore, media window 204 will display User1's first media transmission to partially overlap User1's second media transmission. This is because User1 selected his first media transmission more recently than his second media transmission. Moreover, in response to User1 clicking on his first media transmission, the "Pause" button changes back into the "Resume" button, because User1 earlier paused his first media transmission.

User1 may further click on "Resume" button, so that client 102 resumes updating (i.e. stops freezing) its receipt and output of User1's first media transmission. The content of User1's first media transmission has changed substantially between the earlier time when User1 paused the output of his first media transmission and the later time when User1 resumed the output of his first media transmission. In response to User1 clicking on "Resume" button 242, "Resume" button changes into the "Pause" button Moreover, media window 204 will stop displaying User1's second media transmission, because media window 204 will have finally displayed the end of the captured-and-stored media content of User1's second media transmission.

User1 may also click on "transmit menu" button 212 in transmit/receive window 210. In response to User1 clicking on "transmit menu" button 212, transmit/receive window 210 displays the "transmit menu" instead of the "receive menu", although transmit/receive window 210 displays "receive menu" button 214 FIG. 2. Notably, two curves instead of a single curve still surround "video" button of transmit/receive window 210 as was the case before transmit/receive window 210 displayed "receive menu" 210.

User1 may click on Capture button 244, causing client computer 132 to capture and store User1's media transmission. In response to User1's clicking on Capture button 244, Capture button 244 becomes surrounded by two curves instead of a single curve. User1 may click again on Capture button 244, so that client computer 132 ends its capturing and storing of User1's media transmission.

In response to User1's clicking again on Capture button 244, Capture button 244 becomes surrounded by a single curve instead of two curves. Further, User1 may type a chat message. User1 may click on "video" button 220 FIG. 2, causing client computer 132 to stop outputting User1's media transmission to display device 128, media server 112 and other enabled clients of coordinating system 100.

Accordingly, media window 204 will stop displaying User1's media transmission.

In FIG. 5, User1 may then click on "view threaded message" button 230 in chat window 206. In response, chat window 206 will display a "message window" instead of the "chat window" FIG. 6 and display "view sequence chat" button 231. The message window will display a list of topics. User1 may click on the "National Football League" topic, for example.

Accordingly, chat window 206 will display a list of titles of messages which have been typed by other enabled users of coordinating system 100 regarding, for example, the National Football League. Such an arrangement of message titles and their respective contents, grouped in a nested manner according to topic, are an example of "threaded" messages. Some of the message titles are listed adjacent to "see" button 254 and "hear" button 256, in the same manner as some chat messages were listed adjacent to "see" button 254 and "hear" button 256. In FIG. 6, User1 may click on "hear" button adjacent to the "New Coach" message title.

In response to User1's clicking on "hear" button 256, transmit/receive window 210 will display "receive menu" and display "transmit menu" button 212. Also, client computer 132 will output signals to speakers 126, thereby making User1 free to hear audio frequencies represented by such signals. Window 206 will display a message, such as, for example, "This is what the Lions' new coach said about the team's new players", the name ("Fred Smith") of the message's author, the global computer network identification ("FSmith@acme.com") of the message's author, and the date ("Apr. 15, 1997") when the message was created, all associated with the "New Coach" message title.

User1 may click on the "down" arrow adjacent to the list of message titles. Consequently, the list of message titles may "scrolls", causing chat window 206 to stop displaying the message title and instead begin displaying the next message title. Also, User1 may click on "End" button 240 in transmit/receive window 210 FIG. 5, causing client 102 to stop receipt and output of the prior sender's media transmission.

User1 may type a message and include brackets (i.e., "{ }") to distinguish the message's title from its remaining content. The list of message titles will be updated with User1's message. The title of User1's message is inserted at a location within the list as a subtitle to the above "New Coach" message title, for example. Such location within the list may be determined by the fact that User1 most recently clicked on the "New Coach" message title.

In FIG. 6, User1 may click on the "down" arrow adjacent to the list of topics. Consequently, the list of topics "scrolls", so that chat window 206 stops displaying the "NCAA Basketball" topic and instead begins displaying the "Politics" topic, for example. User1 may click on the "Politics" topic. In response, chat window 206 will display a list of titles of messages which have been typed by other enabled users of coordinating system 100 regarding politics.

User1 may click on "see" button 254 adjacent to a message title. In response to User1's clicking on "see" button 254, client computer 132 will output digital information to display device 128 and signal to speakers 126, so that User1 is free to view images represented by such digital information and to hear audio frequencies represented by such signals, and chat window 206 displays a message, the name of the message's author, the global computer network identification of the message's author, and the date when the message was created, all associated with the message title.

User1 may also click on the "End" button in transmit/receive window 210 FIG. 5, so that client 102 stops its receipt and output of media transmission.

Moreover, User1 may type a message. The portion of User1's message in brackets (i.e. "{ }") will distinguish the message's title from its remaining content. The insert embodiment also provides a list of message titles that is updated with User1's message. The title of User1's message is inserted at a location within the list as a subtitle to the message title. Such location within the list is determined by the fact that User1 most recently clicked on an associated message title.

User1 may click on "Attach" button 228. In response to clicking on "Attach" button 228, client computer 132 outputs through TCP/IP network 110 User1's message to server 114 and other enabled clients of coordinating system 100, as well as the captured-and-stored media transmission from the beginning of such capture to the end of such capture. User1's previous media transmission that was captured and stored to media server 112 is provided to other enabled clients of coordinating system 100.

The list of message titles will be updated with User1's message. The title of User1's message will be inserted at a location within the list as a subtitle to the message title. Such location within the list is determined by the fact that User1 most recently clicked on the particular message title. User1 may click on "see" button 254 adjacent to the message title.

In response to User1's clicking on "see" button 254, client computer 132 outputs digital information to display device 128 and signals to speakers 126 so that User1 is free to view images represented by such digital information and to hear audio frequencies represented by such signals. In addition, chat window 206 displays a message, the name of the message's author, the global computer network identification of the message's author, and the date when the message was created, all associated with the message title.

User1 may click on "End" button 240 in transmit/receive window 210 FIG. 5, so that client 102 stops its receipt and output of User1's media transmission. Even if User1 did not click on the "End" button, media window 204 would automatically stop displaying User1's media transmission after media window 204 finally displayed the end of the captured-and-stored media content of User1's media transmission.

Figure 7:
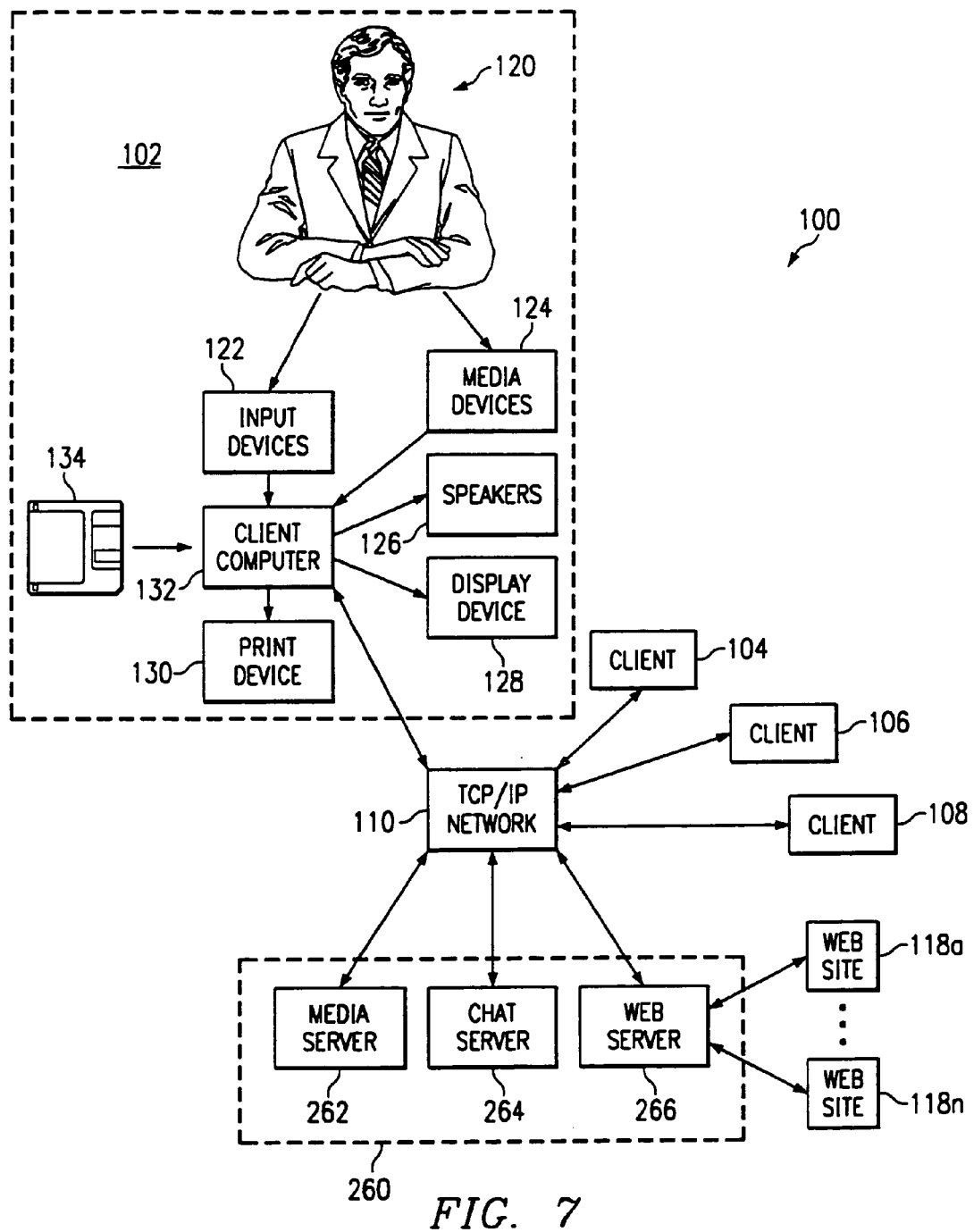
FIG. 7 provides a block diagram of a coordinating system for an alternative embodiment of the present invention.

FIG. 7 provides a block diagram of an alternative embodiment of coordinating system 100. In such an alternative embodiment, media server 112, chat server 114 and Web server 116 of FIG. 1 are replaced by a single server 260. Server 260 executes a media server process 262, a chat server process 264, and a Web server process 266. Media server process 262 is substantially identical to the process executed by media server 112 of FIG. 1. Also, chat server process 264 is substantially identical to the process executed by chat server 114 of FIG. 1. Moreover, Web server process 266 is substantially identical to the process executed by Web server 116 of FIG. 1. Media server process 262, chat server process 264, and Web server process 266 communicate with one another in a manner substantially identical to the manner in which the respective processes of media server 112, chat server 114 and Web server 116 communicate with one another.

Figure 8:
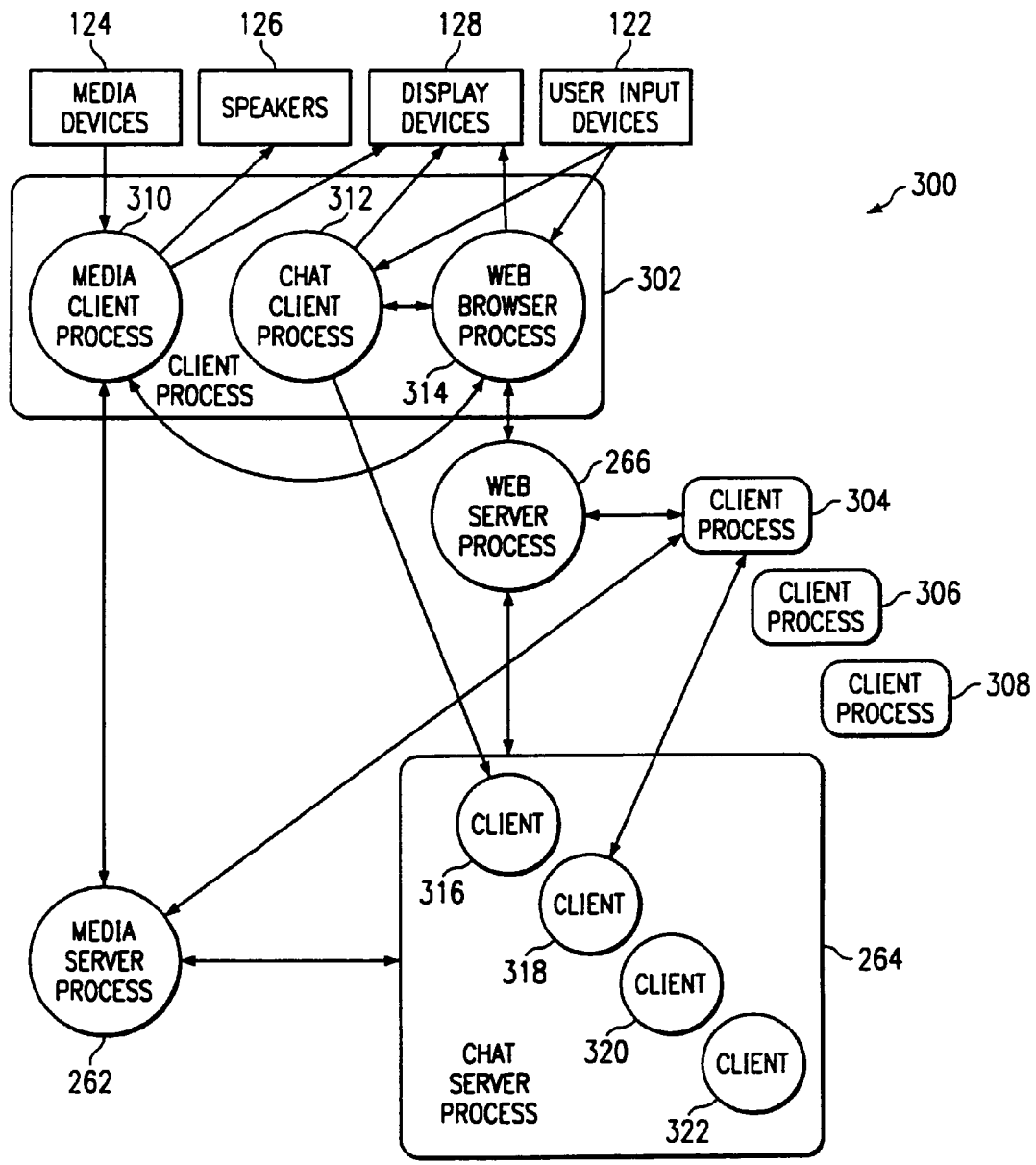
FIG. 8 shows a data flow diagram for the coordinating system of FIG. 1.

FIG. 8 shows a data flow diagram, indicated generally at 300, of processes executed by coordinating system 100 of FIG. 1. More particularly, client computer 132 executes a client process 302. Likewise, clients 104, 106 and 108 may execute client processes 304, 306 and 308, respectively. For clarity, FIG. 8 shows detail only for client process 302. Nevertheless, client processes 302, 304, 306 and 308 are substantially identical to one another, and client process 302 is a representative one of client processes 302, 304, 306 and 308.

For example, client process 302 includes a media client process 310, a chat client process 312, and a Web browser process 314. Media client process 310 is for receiving signals from media devices 124, for outputting signals to speakers 126, for outputting information to display device 128 for display on media window 204, and for outputting and receiving information to and from chat client process 312 and media server process 262. Chat client process 312 is for receiving information and signals from input devices 122, for outputting information to display device 128 for display on chat window 206, and for outputting and receiving information to and from media client process 310, Web browser process 314 and chat server process 264. Web browser process 314 is for receiving information and signals from input devices 122, for outputting information to display device 128 for display on Web browser window 202, and for outputting and receiving information to and from chat client process 314 and Web server process 266.

Likewise, each of client processes 304, 306 and 308 includes a respective media client process, chat client process, and Web browser process, is connected to a respective display device, media devices, speakers and input devices and is further connected to media server process 262, chat server process 264 and Web server process 266.

Chat server process 264 includes client subprocess objects 316, 318, 320 and 322. As shown in FIG. 8, client subprocess object 316 is for outputting and receiving information to and from chat client process 312 of client process 302. Likewise, client subprocess object 318 is for outputting and receiving information to and from client process 304 and although not shown in FIG. 8 for clarity, client subprocess objects 320 and 322 are for outputting and receiving information to and from client processes 306 and 308, respectively. Each of client subprocess objects 316, 318, 320 and 322 is for outputting and receiving information to and from media server process 262 and Web server process 266. Also, client subprocess objects 316, 318, 320 and 322 output and receive information to and from one another.

In an alternative embodiment, chat server process 264 connects through a first link to media server process 262, a second link to Web server process 266, and respective links to client processes 302, 304, 306 and 308. Within chat server process 264, such links are distributed to client subprocess objects 316, 318, 320 and 322, so that such client subprocess objects do not have their own respective links external to chat server process 264.

Web browser process 314 communicates information with (i.e., sends and receives information to and from) chat client process 312 through an application program interface ("API"). Also, media client process 310 communicates information with chat client process 312 through an API.

Web server process 266 outputs and receives instructions or "requests" to and from Web browser process 314. In response to instructions and browser information received from Web server process 266, Web browser process 314 outputs suitable instructions to display device 128, so that display device 128 displays Web browser window 202 and such browser information therein. In response to instructions and chat information received from client subprocess object 316 of chat server process 264, chat client process 312 outputs suitable instructions to display device 128, so that display device 128 displays chat window 206 and such chat information therein. In response to instructions and media information received from media server process 262, media client process 310 outputs suitable instructions to display device 128, so that display device 128 displays media window 204 and such media information therein Also, in response to instructions from user 120 via input devices 122 Web browser process 314 outputs suitable instructions to Web server process 266 which (in response thereto) outputs instructions to one or more of client processes 304, 306 and 308, and/or Web sites 118a through 118n of FIG. 1 as specified by user 120.

Also, responsive to user 120 instructions, chat client process 312 outputs suitable instructions and chat information to client subprocess object 316 which, in response thereto, outputs such instructions and chat information to selected one(s) of client subprocess objects 318, 320 and 322 for further output to selected one(s) of client processes 304, 306 and 308, respectively.

Moreover, in response to instructions from user 120 via input devices 122, chat client process 312 outputs suitable instructions to media client process 310 which, in response thereto, outputs suitable instructions and media information to media server process 262 for further output to selected one(s) of client processes 304, 306 and 308. Such further output to selected one(s) of client processes 304, 306 and 308 is coordinated by client subprocess objects 316, 318, 320 and 322, respectively. Client subprocess objects 316, 318, 320 and 322 perform such coordination according to a predetermined (or preselected) communications protocol, analogously to the manner in which internet "browsing" is coordinated in the illustrative embodiment with chat operations.

With a technique known as integrated HTML chat, internet "browsing" is coordinated with chat operations. According to the integrated HTML chat technique, a chat window 206 appears to the user as being embedded within an HTML Web page, such as Web browser window 202. For example, in one embodiment, chat server process 264 is an IRC chat server process. Accordingly, from chat server process 264, chat client process 312, which is executed by computer 132, receives the HTML Web page containing chat information for display by display device 128 within chat window 206. By using the electronic keyboard of input devices 122 to type a message or "chat" for display within chat window 206, user 120 revises the HTML Web page, and chat client process 312 outputs the revised HTML Web page to client subprocess object 316.

Various implementations of chat server process 264 to coordinate chat and browse operations of coordinating system 100 are possible and include a variety of instruction sets as well as linear and object oriented programming techniques. Illustratively, compiled C++ computer language is suitable for implementing chat server process 264, although other languages are also suitable. Another such language may be that known as LPC, which is an object-oriented interpreted language that is widely used for multi-user network processes, typically Multi-User Dungeons ("MUDs"). In the illustrative embodiment, chat server process 264 is formed by multiple core software objects within the LPC framework. Such core objects are client objects, connection objects, and room objects.

Preferably, chat server process 264 is implemented using object-oriented techniques. As shown in FIG. 8, clients 102, 104, 106 and 108 are associated with, and are represented within chat server process 264 as, client subprocess objects 316, 318, 320 and 322, respectively. With client objects (e.g., client subprocess objects 316, 318, 320 and 322), chat server process 264 identifies clients (e.g. clients 102, 104, 106 and 108, respectively) which communicate with and are connected to chat server process 264, and chat server process 264 distinguishes individual preferences of such clients. Each such client identifies itself, if desired, by outputting (to chat server process 264) attribute information such as a name, gender, address, e-mail address, URL, avatar, and description.

Chat server process 264 stores such attribute information with the client's associated client object. In response to a request from another client, chat server process 264 outputs such attribute information to the requesting client. Also, chat server process 264 stores, with the client's associated client object, the connection method by which the client is connected to chat server process 264.

The connection method is stored with connection objects. Client objects inherit associated connection objects and read the connection method therefrom. By varying connection objects, chat server process 264 is capable of supporting network connections according to a variety of standard network communication protocols. Such protocols include Telnet, HTML, IRC, and raw TCP/IP socket level communication protocols. A client connected to chat server process 264 can specify one or more of such protocols by specifying a suitable connection object for connecting to, and communicating with, chat server process 264 and other clients.

When a client connects to chat server process 264, chat server process 264 assigns an associated client object to the client. Also, chat server process 264 reads the preferences of such client from a database and implements such preferences. All objects within chat server process 264 identify actions that are invocable by a client object to support communication with other client objects. For example, such actions include various methods of communicating text between clients, viewing URLs between clients, and transferring files between clients.

Real time chat server process 264 maintains the message session and coordinates browse, media and chat operations by dynamically linking Web browser processes, media client processes and chat processes, so that contents of the Web browser window, media window and chat window change in a coordinated manner. In that manner, multiple users' Web browser processes, media client processes, and chat client processes are connected into a powerful distributed chat/media/HTTP server operation. For example, all such users are able to fully interact with one another in a coordinated manner through typewritten messages, HTML Web documents, and file transfers. In operation, the real time chat server process 264 coordinates the browse, media and chat operations to change the chat, media and Web browser content in a coordinated, "synchronized," or "dynamically linked" manner. Such content includes, for example, information displayed in chat window 206, media window 204 and Web browser window 202. The illustrative embodiment also supports the non-synchronization of such content.

The examples of communications through coordinating system 100 show advantages of such a dynamic link between the browse, media and chat operations. Preferably, chat window 206 and media window 204 are embedded in Web browser window 202, although the different windows may be separate if desired. In an alternative embodiment, Web browser window 202 and media window 204 are embedded in chat window 206. In another alternative embodiment, Web browser window 202 and chat window 206 are embedded in media window 204. As an example, where chat window 206 is embedded in Web browser window 202, Web browser process 314 invokes a chat plug-in process to handle chat information, so that chat information, such as a chat Web page, is displayed in chat window 206 in a plug-in manner.

Figure 9:
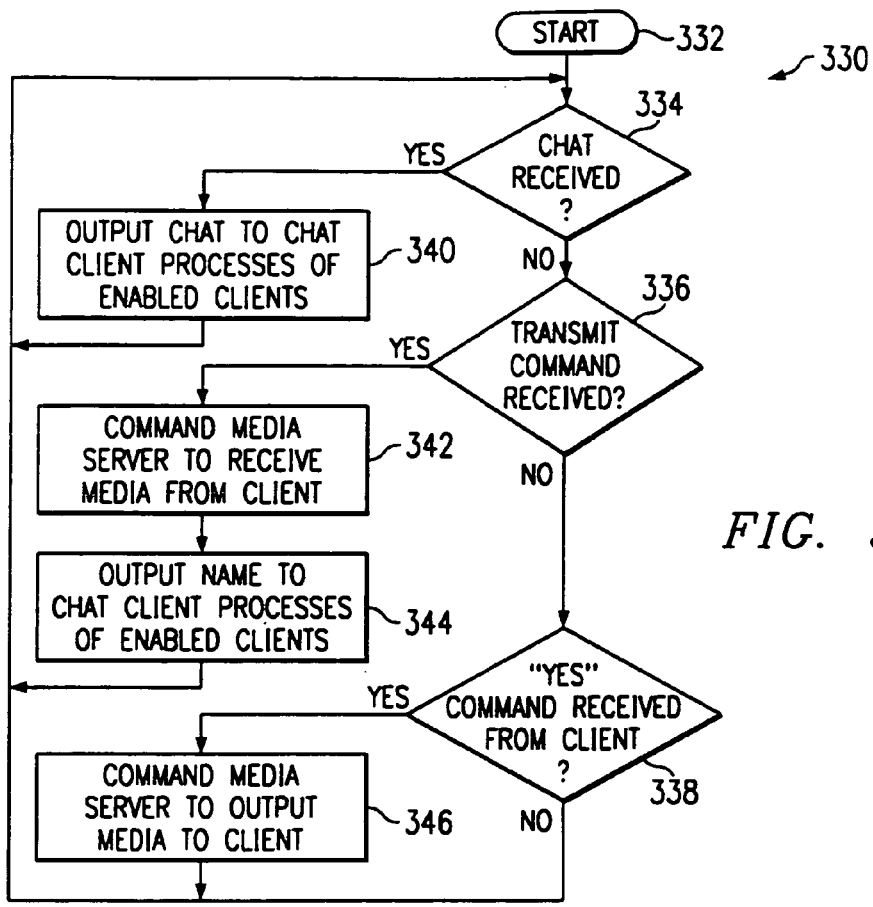
FIG. 9 gives a logical flow diagram for one process of the present invention.

FIG. 9 provides flowchart 330 to describe the operation of chat server process 264. First, after start step 332, chat server process 264 determines, at a step 334, whether it has received a message from an enabled client. If the answer is NO, chat server process 264 determines, at a step 336, whether it has received a transmit command from an enabled client. This occurs, for example, when an enabled user has clicked on either the "video", "audio" or "photo" buttons in his/her associated "transmit menu". If the answer is NO, chat server process 264 determines, at a step 338, whether it has received a "YES" command from an enabled client, such as occurs when an enabled user has clicked on a "YES" button, a "see" button, or a "hear" button). If the answer is NO, operation returns to step 334.

If the answer at step 334 is YES, chat server process 264 outputs, at a step 340, the message to chat client processes of all enabled clients. After step 346, the operation returns to step 334.

If the answer at step 338 is YES, chat server process 264 outputs, at a step 346 a command to media server process 262 to output the specified media transmission to the enabled client that requested such media transmission. After step 346, the operation returns to step 334.

If the answer at step 338 is YES, chat server process 264 outputs, at a step 346 a command to media server process 334 to output the specified media transmission to the enabled client that requested such media transmission. After step 346, the operation returns to step 334.

Figure 10:
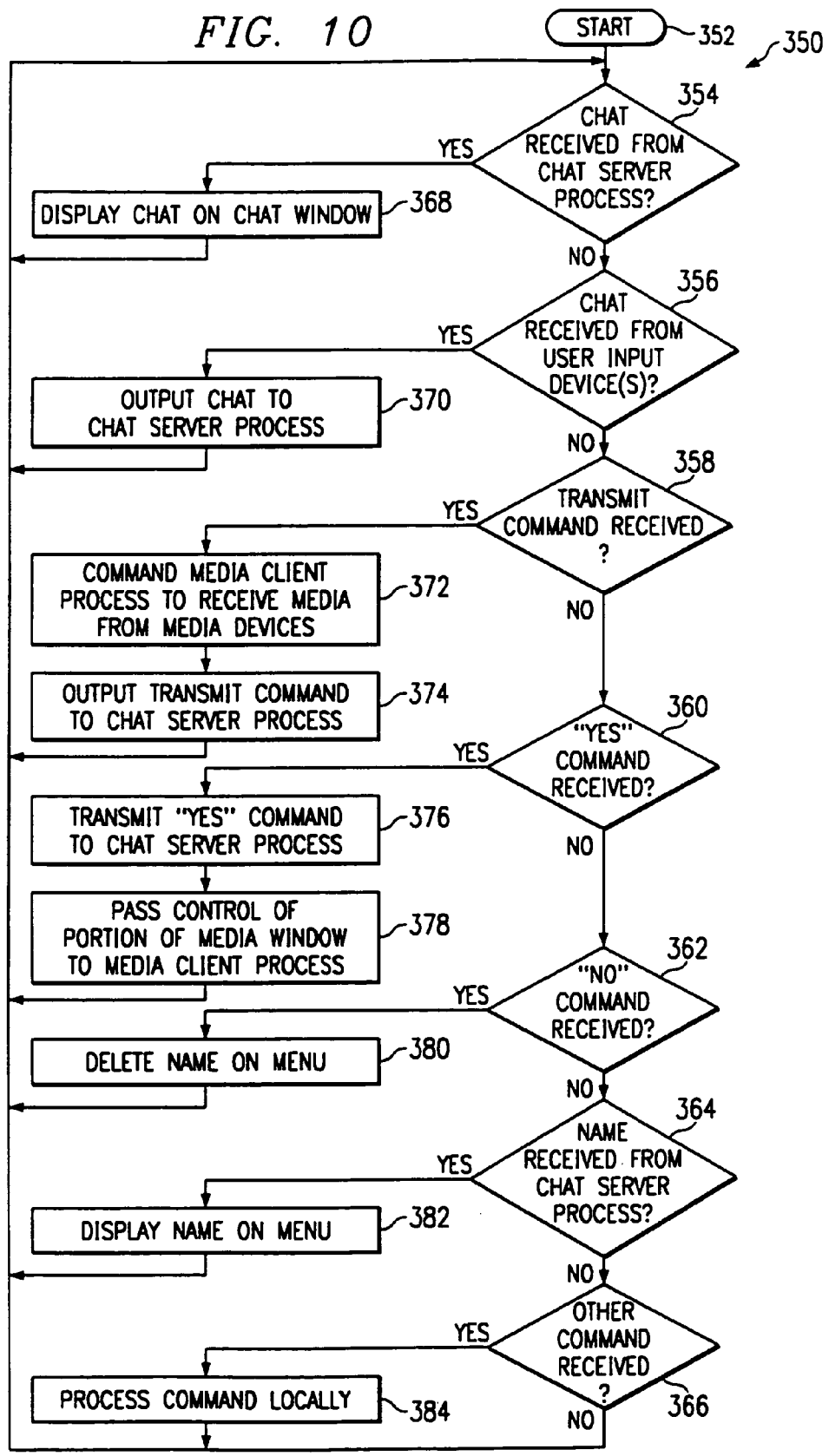
FIG. 10 depicts a logic flow diagram for another process aspect of the present invention displayed by a display device of the system of FIG. 1.

FIG. 10 shows a flowchart 350 to illustrate the operation of chat client process 312. First, after starting at step 352, chat client process 312 determines, at a step 354 whether chat server process 264 has output a message. If the answer is NO, chat client process 312 determines, at a step 356, whether user 120 has typed a message. If the answer is NO, chat client process 312 determines, at a step 358, whether user 120 has clicked on either the "video", "audio" or "photo" buttons in the "transmit menu" of screen 200.

If the answer is NO, chat client process 312 determines, at a step 360, whether user 120 has clicked on "YES" button in media menu 216, "see" button 254, or "hear" button 256. If the answer is NO, chat client process 312 determines, at a step 362, whether user 120 has clicked on a "NO" button. If the answer is NO, chat client process 312 determines, at a step 364, whether chat server process 264 has output, at step 344, an enabled client's name. If the answer is NO, chat client process 312 determines, at a step 366, whether user 120 has entered another command. If the answer is NO, the operation returns to step 354.

If the answer at step 354 is YES, chat client process 312 outputs, at a step 368, the message to display device 128 for display in chat window 206. After step 368, the operation returns to step 354.

If the answer at step 354 is YES, chat client process 312 outputs, at a step 370, the message to chat server process 264. After step 370, the operation returns to step 356.

If the answer at step 358 is YES, chat client process 312 outputs, at a step 372, a command to media client process 310 to receive the media transmission from media devices 124. After step 372, chat client process 312 outputs, at a step 374, a transmit command to chat server process 264. After step 374, the operation returns to step 354.

If the answer at step 360 is YES, chat client process 312 outputs, at a step 376, a "YES" command to chat server process 264. After step 376, chat client process 312 transfers, at a step 378, control of a suitable portion of media window 204 to media client process 310. After step 378, the operation returns to step 354.

If the answer at step 362 is Yes, chat client process 312 outputs, at a step 380, a command to stop listing the rejected media transmission in media menu 216. After step 380, the operation returns to step 354.

If the answer at step 364 is YES, chat client process 213 outputs, at a step 382, a command to list the enabled client's name and media type in media menu 216. After step 382, the operation returns to step 354.

If the answer at step 366 is YES, chat client process 312 suitably processes, at a step 384, the command locally within client 102. After step 384, the operation returns to step 354.

Figure 11:
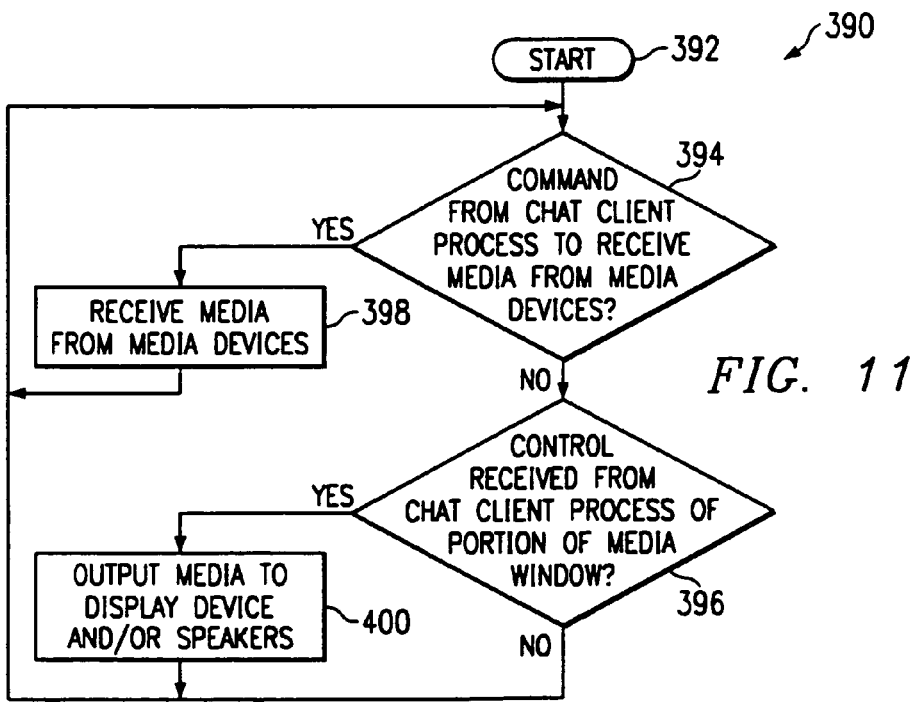
FIG. 11 shows a logic flow diagram for yet another aspect of the present invention.

FIG. 11 gives flowchart 390 to show the operation of media client process 310. First, after start step 392, media client process 310 determines, at a step 394, whether chat client process 312 has output, at step 372, a command for media client process 310 to receive a media transmission from media devices 124. If the answer is NO, media client process 310 determines, at a step 396, whether chat client process 312 has transferred, at step 378, control of a portion of media window 204 to media client process 310. If the answer is NO, the operation returns to step 394.

If the answer at step 394 is YES, media client process 310 receives, at a step 398, the media transmission from media devices 124. After step 398, the operation returns to step 394.

If the answer at step 396 is YES, media client process 310 receives, at a step 400, a media transmission from media server process 262 and outputs such media transmission to display device 128 and/or speakers 126, as applicable. After step 400, the operation returns to step 394.

Figure 12:
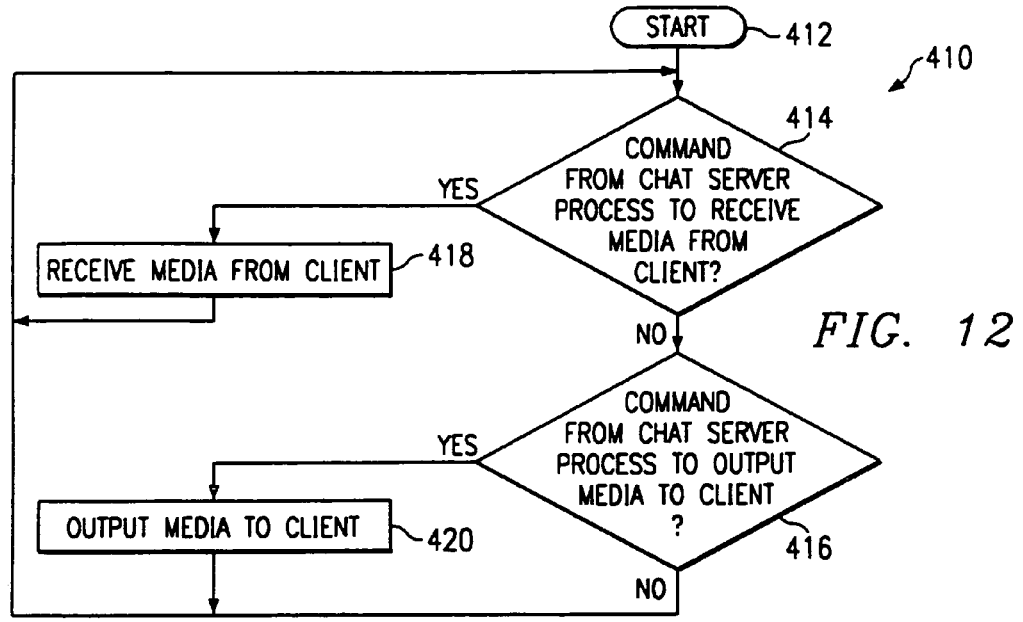
FIG. 12 shows a logic flow diagram for a process similar to that of FIG. 11.

FIG. 12 shows flowchart 410 of an operation of media server process 262. First, media server process 262 determines, at a step 414, whether chat server process 264 has output, at step 342, a command for media server process 262 to receive information regarding a media transmission from the enabled client that output the transmit command. If the answer is NO, media server process 262 determines, at a step 416, whether chat server process 264 has output, at step 346, a command for media server process 262 to output a specified media transmission to the enabled client that requested such media transmission. If the answer is NO, the operation returns to step 414.

If the answer at step 414 is YES, media client process 262 receives, at a step 418, information regarding the media transmission from the enabled client that output the transmit command. After step 418, the operation returns to step 414.

If the answer at step 416 is YES, media client process 262 receives, at a step 420, the specified media transmission from the enabled client that output such media transmission, and media client process 262 outputs such media transmission to the enabled client that requested such media transmission. After step 420, the operation returns to step 414.

Figure 13:
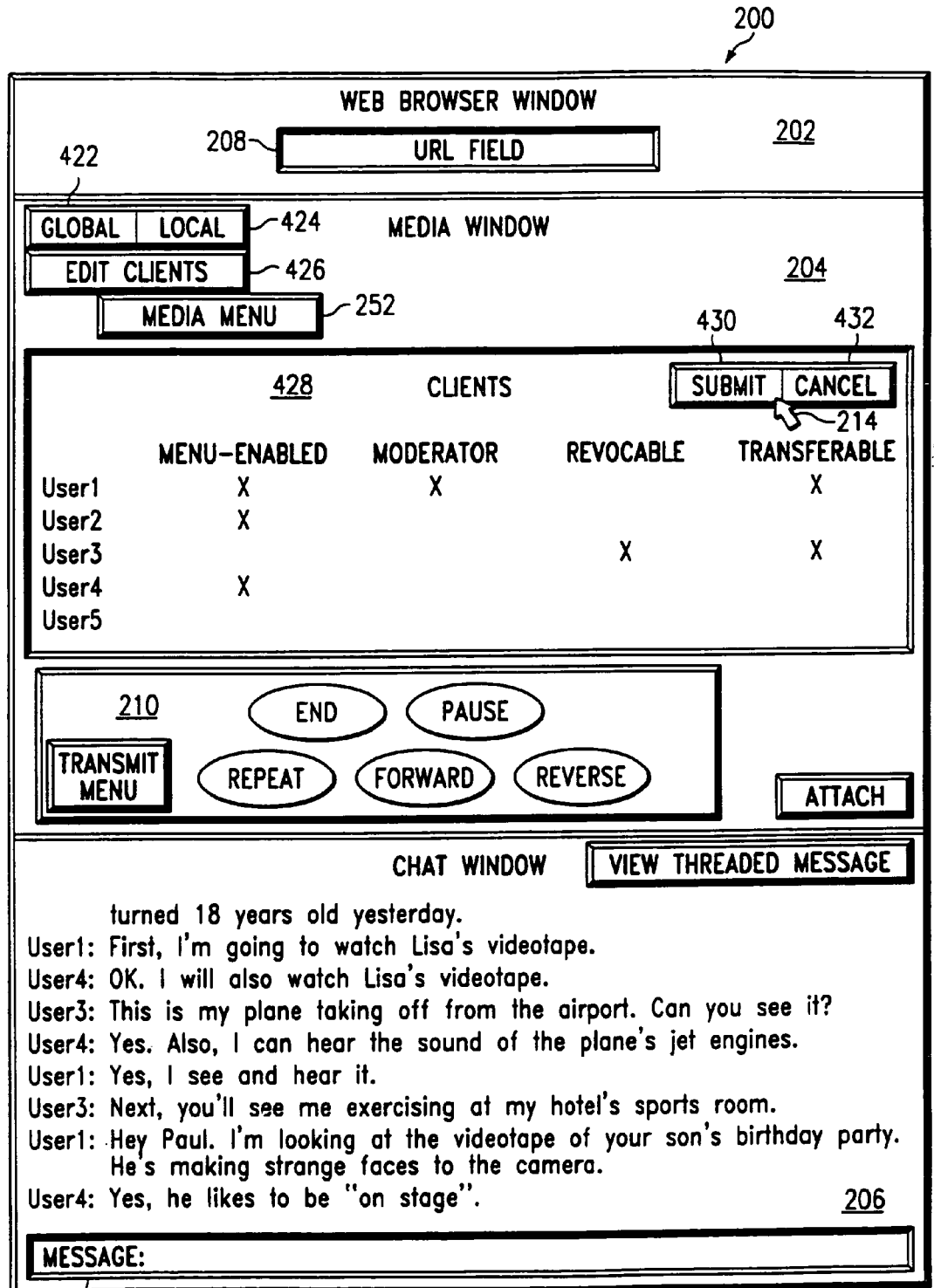
FIG. 13 illustrates another screen display associated with the operation of the present invention.

FIG. 13 is an illustration of screen 200 displayed by display device 128 that shows "global" button 422, "local" button 424, and "edit clients" button 426. In FIG. 13, User1 is a moderator of the chat and media sessions viewed by enabled users of coordinating system 100.

By clicking on "global" button 422, User1 causes the respective associated media windows of other enabled users to display the most recently selected media transmission that is displayed by media window 204. Clicking "global" button 422 also causes the display of subsequently selected media transmissions that are displayed by media window 204, at least until User1 clicks on "local" button 424. Conversely, by clicking on "local" button 424, User1 would disallow the respective associated media windows of other enabled users from displaying subsequently selected media transmissions that are displayed by media window 204. This is true, even if such media transmissions are already being displayed by the respective associated media windows of other enabled users, at least until User1 clicks on "global" button 422.

As FIG. 13 shows, after first clicking "local" button 424, User1 may click on "edit clients" button 426. In response, media window 204 will display a "clients" menu 428 that User1 uses to moderate, or "control", the chat and media sessions viewed by enabled users of coordinating system 100. As shown in FIG. 13, enabled users User1, User2, and User4 are identified (by "X" symbols) as "menu-enabled", whereas enabled users User3 and User 5 are not identified as "menu enabled". Only those users who are identified as "menu enabled" are able to view media menus by clicking on their respective associated "Media Menu" buttons 252. If a user is not identified as "menu enabled", such user is not able to view a media menu.

In one embodiment, User1 selects which, if any, of the media transmissions that are listed in response to pressing media menu button 252 are to be listed in media menus viewed by "menu enabled" users. User1 makes such selections by clicking on the media transmissions respective listing that are displayed in response to pressing media menu button 252, thereby marking the selected media transmissions with asterisks. Moreover, User1 is able to de-select such a selected media transmission or such a selected message by double-clicking on its adjacent associated asterisk (not shown), so that such asterisk no longer appears on screen 200.

Also, as shown in FIG. 13, only User1 is identified (by an "X" symbol) as the "moderator" of the chat and media sessions viewed by enabled users of coordinating system 100. User1's status as "moderator" is not revocable by any other user. User1 is free to transfer his "moderator" status to another enabled user. Accordingly, screen 200 identifies (by an "X" symbol) User1's and User4's status as "transferable".

Users may make revisions to "clients" menu 428. User1 may, for example, make such revisions by clicking on various locations marked by "X" symbols in "clients" menu 428. User1 may, for example, identify User3 as "menu enabled" and transfer a revocable transferable moderator status to User3, although User1 could have transferred such status to User3 without such status being subject to revocation by User1, and/or transferable by User3 to another enabled user. In FIG. 13, User1 may click on "submit" button 430 to effect his revisions to the "clients" menu, although transmissions in media menu 216 are viewable by other enabled users identified as "menu enabled".

By transferring a revocable transferable moderator status to User3, User3 is free to view and revise "client" menu 428 on User3's associated display device. This would occur, for example, upon revising other users' respective status as "menu enabled" or not "menu enabled". Generally, however, User3 would not be free to revise User1's status. User3 would be free to transfer moderator status to another enabled user of User3's choosing, although such moderator status is subject to revocation by User1. In connection with such a transfer, User3 would be free to specify whether such moderator status is subject to revocation by User3.

User1 may also select which, if any, of the messages in chat window 206 will be displayed by the respective display devices associated with other enabled users. User1 may select the messages by clicking on them, thereby marking the selected messages with asterisks. If a message is not marked with an asterisk, such message is not viewed by other enabled users. Likewise, User1 may select which, if any, of the messages in chat window 206 will be displayed by the respective display devices associated with other enabled users, and which, if any, of the listed media transmissions in media menu 212 are viewable by other enabled users identified as "menu enabled".

If User1 clicks on "global" button 422, then respective associated media windows of other enabled users will display the most recently selected media transmission that is displayed by media window 204. Also, User1 may click on chat window 206 and, while continuing to activate the switch of the pointing device, relocate chat window 206 within screen 200.

Figure 14:
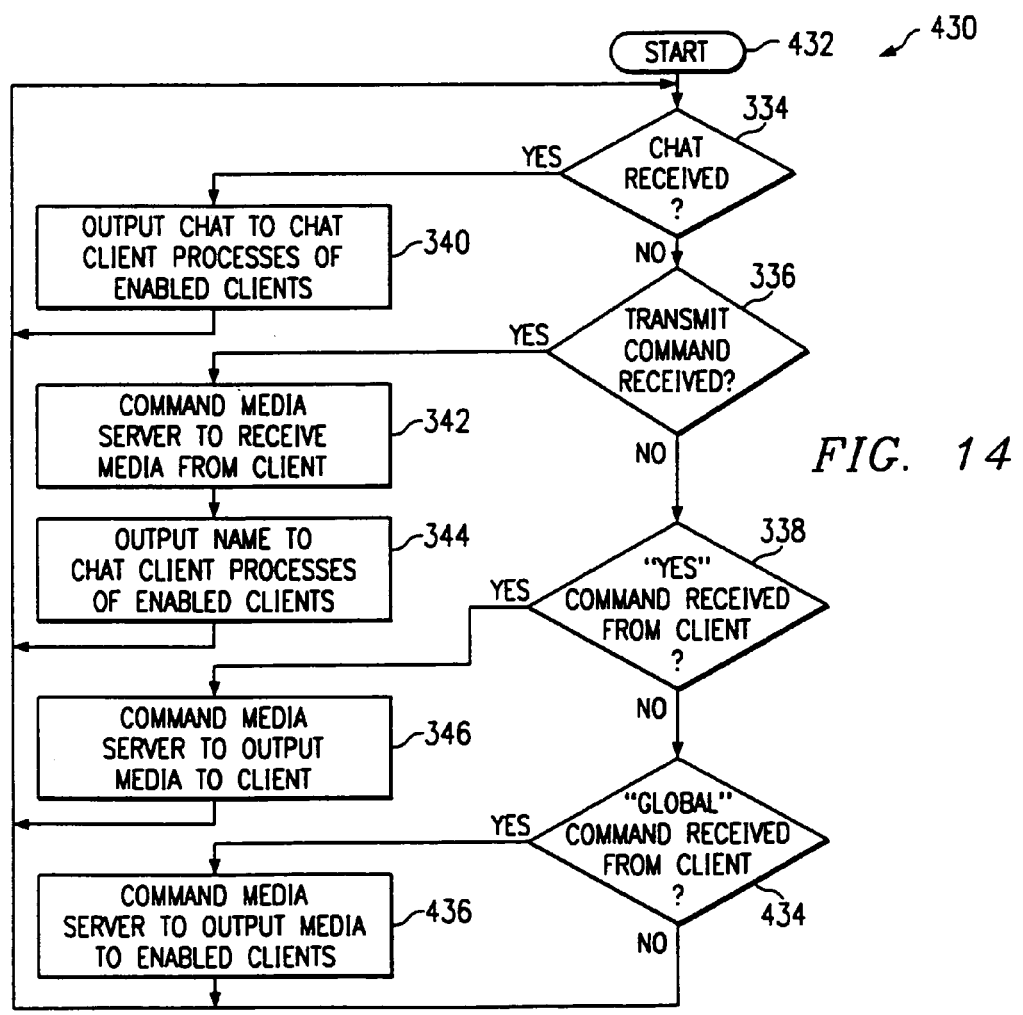
FIG. 14 shows a logic flow diagram for a process similar to that of FIG. 9.

FIG. 14 provides flowchart 430 of an operation of chat server process 264 that is modified in the following manner. If the answer at step 338 is NO, the operation does not return directly to step 354; instead, chat server process 264 determines, at a step 434, whether a "global" command has been sent by an enabled client having moderator status. If the answer is NO, the operation returns to step 334. If the answer is YES, chat server process 264 outputs, at a step 436, a command to media server process 262 to output the specified media transmission to all enabled clients. After step 436, the operation returns to step 334.

FIG. 15 shows flowchart 440 for the operation of an alternative chat client process 312 that is essentially similar to chat client process flowchart 350 of FIG. 10, except that FIG. 15 is modified in accordance with the discussion hereinabove in connection with FIGS. 13 and 14. More particularly, FIG. 15 is modified in the following manner. If the answer at step 364 is NO, the operation does not continue directly to step 366; instead, chat client process 312 determines, at a step 444, whether User1 has clicked on "global" button 422. If the answer is NO, operation continues to step 366. If the answer is YES, chat client process 312 outputs, at a step 446, a "global" command to chat server process 264. After step 446, operation returns to step 354.

Figure 16:
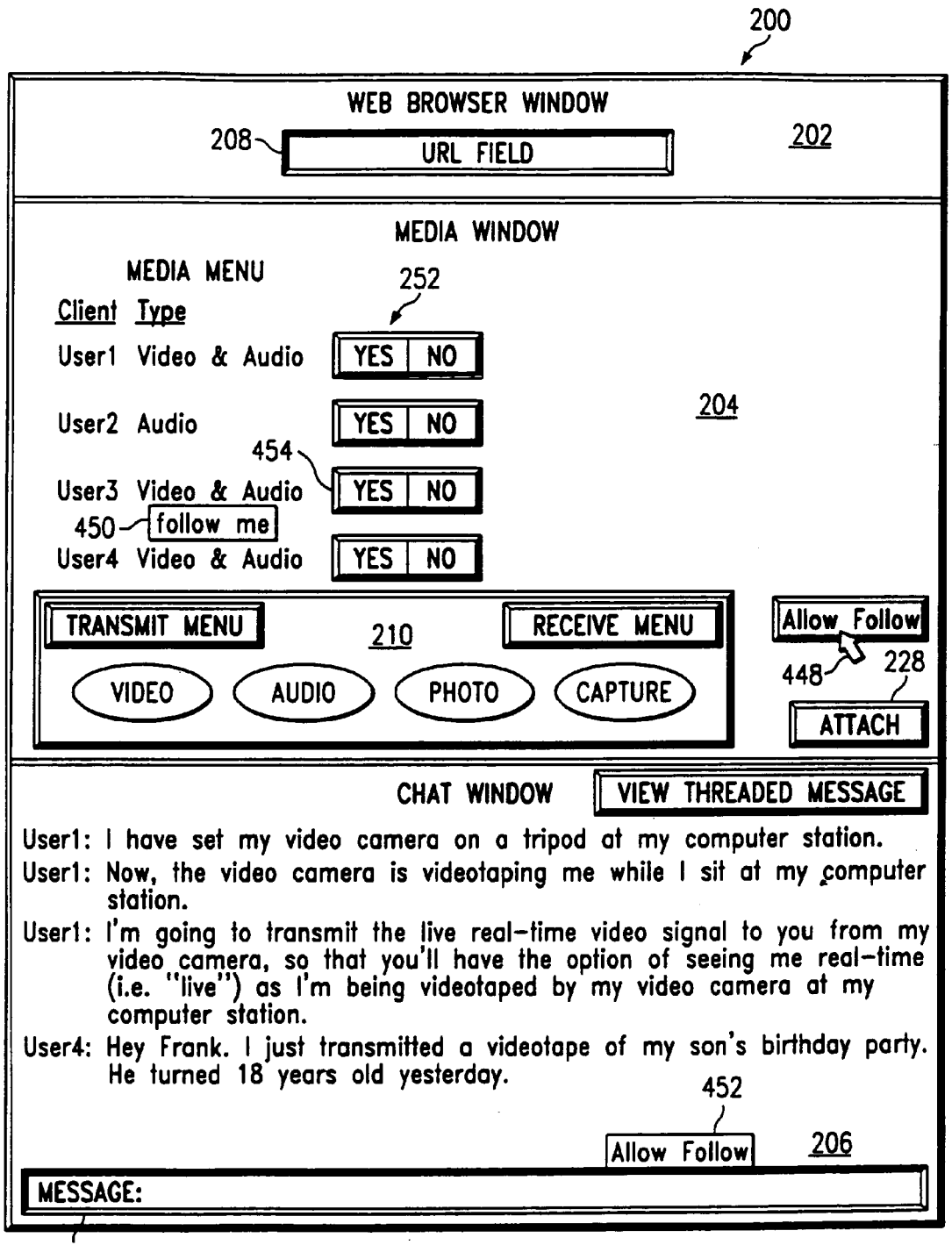
FIG. 16 is an illustration of a yet another screen displayed by a display device of the system of FIG. 1.
Figure 17:
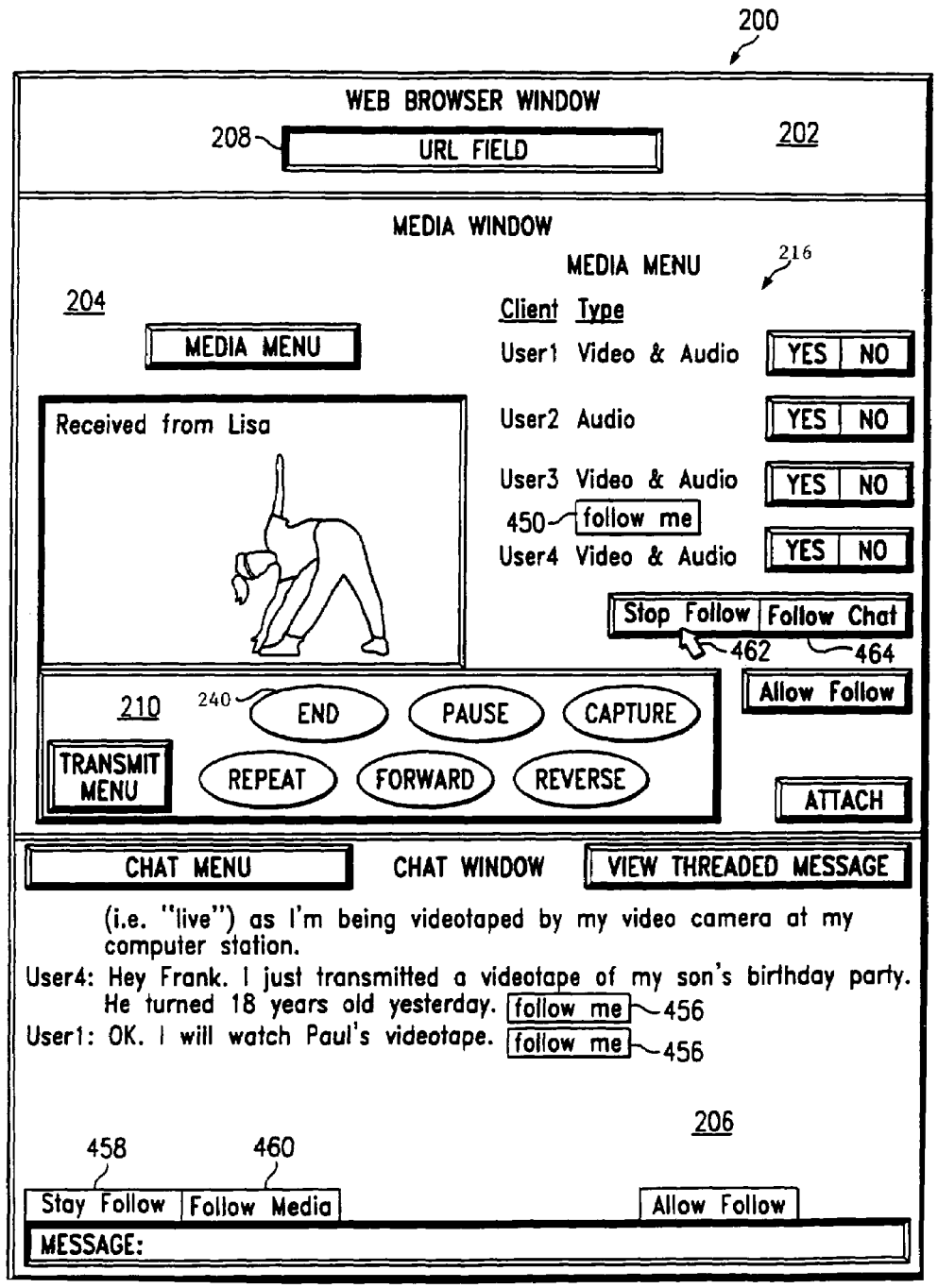
FIG. 17 depicts yet a further screen display that may appear on a monitor for a computer system employing the teachings of the present invention.

FIGS. 16 and 17 show screen 200 displayed by display device 128 wherein user 120 of FIG. 1 is User2. In addition to features of coordinating system 100 already discussed hereinabove, FIG. 16 further shows "allow follow" button 448 and "follow me" button 450 in media window 204, plus "allow follow" button 452 in chat window 206. In FIG. 16, User2 clicks on "allow follow" button 448 in media window 204.

In response to User2 clicking on "allow follow" button 448, "allow follow" button 448 changes into a "no follow" button (not shown) in media window 204, and a "follow me" button is displayed adjacent to User2's name in the respective media menus associated with all enabled users of coordinating system 100, including but not limited to media menu 216. By clicking on "no follow" button, User2 causes the "no follow" button 448' to change back into "allow follow" button in media window 204. This also causes the "follow me" button to stop being displayed adjacent to User2's name in the respective media menus associated with all enabled users of coordinating system 100. By displaying the "follow me" button adjacent to User2's name in each enabled user's respective associated media menu, such enabled user is free to click on "follow me" button 450, so that his/her respective associated media window 204 displays the most recently selected media transmission that is displayed by media window 204 by user 2.

User2 may click on "YES" button 454 adjacent to User3's listing in media menu 252. In response to User2's selection, media window 204 displays User3's "media transmission, along with an indication that such media transmission is received from User3. Also, User2 may "double-click" (i.e., clicks twice within a predetermined, or preselected, short period of time) on chat window 206. In response, chat window 206 will display messages of the particular message session that is associated with the most recently selected media transmission (i.e., User3's media transmission) being displayed in media window 204 (see FIG. 17).

Also, in FIG. 17, User2 may click on "follow me" button 456 adjacent to one of User3's messages displayed in chat window 206. In the illustrative embodiment, it does not matter whether User2 clicks on the first or second "follow me" button adjacent to User3's first and second messages displayed in chat window 206. In response to User2 clicking on either one of such "follow me" buttons 456, chat window 206 displays messages appearing in User3's associated message window, and "stop follow" button and "follow media" button 460. In that manner, User2 "follows" User3's message window content.

Also, User2 may double-click on media window 204. In response, media window 204 will display media of the particular media session that is associated with the message session being displayed in chat window 206. User2 may click on "follow media" button 460, so that media window 204 displays media that is displayed in User3's associated media window, and chat window 206 stops displaying "follow media" button 460. In that manner, User2 "follows" User3's media window content, which is not necessarily the same as the content of the particular media session that is associated with the message session being displayed in chat window 206.

In FIG. 17, User2 may click on the "stop follow" button 462. In response, media menu 216 stops displaying the "stop follow" and "follow chat" buttons, and media window 204 continues displaying media that is displayed in User3's associated media window. However, when User3's associated media window begins displaying media from a new media source, media window 204 will continue displaying media from the old media source. User2 may further click on "End" button 240 in media window 204, so that media window 204 stops displaying the most recently selected media transmission from the old media source.

The following discussion provides more information regarding coordinating system 100. A conventional transfer protocol for the internet is Hypertext Transfer Protocol ("HTTP"). HTTP is a stateless protocol which operates together with TCP/IP to transfer documents at a high rate of speed. As a stateless protocol, HTTP generally does not retain information from one document transfer to another. Accordingly, each document is transferred by establishing a new HTTP connection, requesting the document, delivering the document, and ending the HTTP connection.

Although HTTP is practical for many internet operations, HTTP is less effective for supporting real time operations, such as chat, through networks such as the internet. However, internet Relay Chat ("IRC") protocol supports chat through the internet. In a client/server system, IRC operates together with TCP/IP. For example, multiple IRC client processes 302, 304, 306 and 308 may connect through a single channel to IRC chat server process 264. As discussed hereinabove in connection with FIG. 1, IRC chat server process 264 is executed by a host computer which may be distinct from a host computer executing Web server process 266. IRC chat server process 264 mediates transfers of information through the channel between all connected IRC client processes, so that messages are selectively passed from an originating one of such IRC client processes either (i) to all other connected IRC client processes or (ii) to a subset of all other connected IRC client processes as specified by the originating IRC client process.

Illustratively, Web server process 266 communicates information through an HTTP connection, and chat server process 264 communicates information through a Telnet or IRC connection. Normally, an HTTP connection closes after completion of a document transfer, according to Web server processes such as Netscape Navigator and Microsoft Explorer. However, according to alternative technologies, such as server push, the HTTP connection remains open. Normally, Telnet and IRC connections remain open.

Chat server process 264 and Web server process 266 are suitable for handling a message session using plug-ins and ActiveX controls, as well as Java applets in any combination, such as Netscape Navigator chat plug-ins for Windows 95 and Macintosh System 7, ActiveX controls for Microsoft internet Explorer 3.0, Java client processes (Unix and Others), and stand-alone client processes for Microsoft Windows 3.1 (Unix and Others). Preferably, chat server process 264 and Web server process 266 support all popular extensions, such as images, frames, plug-ins, Java™ and JavaScript, and ActiveX, and all popular multimedia extensions such as Real Audio, Shockwave, Java Applets and others. In that manner, coordinating system 100 achieves seamless and platform independent communication between clients connected to chat-enabled Web pages.

In an implementation of chat server process 264 suitable for the Web, client subprocess objects 316, 318, 320 and 322 are preferably linked to Web server process 266 for various reasons, including to establish a particular HTTP connection in situations where the client subprocess object is not the originator of a new connection request. If the HTTP connection to the client subprocess object is terminated, as is likely to occur, chat server process 264 does not instruct Web server process 266 to push a new document to the client's Web browser process. However, through the Telnet or IRC connection, chat server process 264 instructs the client's chat client process to read a new HTML Web page document.

In response to such instruction from chat server process 264, the client's chat client process outputs a request to the client's Web browser process, which then receives the new HTML Web page document from Web server process 266. Conversely, if the HTTP connection is open and the new HTML Web page document is from the same Web site as the current HTML Web page document, then Web server process 266 outputs the new HTML Web page document to the client's Web browser process, (a) in response to a request from chat server process 264 or (b) alternatively, in response to a request from the client's Web browser process.

In response to a suitable command from user 120, client computer 132 initiates client process 302. More particularly, in response to one or more commands from user 120, client computer 132 initiates one or more of Web browser process 314, chat client process 312 and media client process 310. In the illustrative embodiment, chat client process 312 is a real time markup ("RTM") chat client process. Referring to FIG. 1, an operating system ("OS") of client computer 132 establishes a two-way TCP/IP connection (through TCP/IP network 110) between client computer 132 and chat server 114, which is a host computer for the message session and which executes TCP/IP host process software. Chat client process 312 establishes a real time protocol ("RTP") connection, typically full duplex, between chat client process 312 and chat server process 264. Other clients join the message session by establishing their own respective TCP/IP connections (through TCP/IP network 110) and initiating their own respective RTM chat client processes.

Chat client process 312 is capable of sustaining what appears to user 120 to be real time chat. The effect of real time is created by establishing a continuously open connection protocol for the RTP, as for example a continuously open streaming protocol such as Telnet or a continuously open connection packet protocol such as IRC.

Telnet is a well-known streaming protocol for establishing bi-directional continuously opened sockets and full duplex data transmission to achieve real time communications. The Telnet protocol is an industry standard. The operating systems of UNIX host computers generally include Telnet server processes. IRC is a well-known packet protocol for establishing bi-directional continuously opened sockets and full duplex data transmission to achieve real time communications. The IRC protocol is an industry standard, defined in RFC 1459. Other examples of continuously opened connection streaming protocols include Transmission Control Protocol (TCP) and a variety of proprietary protocols. In contrast, the HTTP protocol defines a transactional half-duplex data transmission. HTTP connections are opened and closed as documents are requested and sent, and real time communication is not realized.

After the TCP/IP and Telnet connections are established, Telnet HTML chat client process 312 begins to receive messages posted by chat server process 264. Also, chat client process 312 may output messages to other Telnet HTML chat client processes through chat server process 264 or remain idle when no messages are being output or received. Non-HTML Telnet client processes may also be connected to chat server process 264, although such client processes would normally display received messages with less fidelity, because such client processes would normally be less capable of properly parsing such messages.

A markup language enables document formats to be defined, and may also enable hyperlinks to be embedded in documents. A popular markup language for the Web is HTML, which supports embedded hyperlinks, various font styles such as bold and italics, and various MIME (Multipurpose internet Mail Extension) file types for text and embedded graphics, video and audio. Although the illustrative embodiment uses HTML, alternative embodiments use other markup languages.

In communicating an HTML Web page, an HTTP Web server process at the user-specified Web site (e.g. one of Web sites 118a–n of FIG. 1) outputs an HTML Web page to Web browser process 314. The HTML Web page normally includes various HTML tags. In response to such HTML tags, Web browser process 314 outputs suitable requests to display device 128, so that display device 128 displays the HTML Web page in Web browser window 202 responsive to the HTML tags.

Illustratively, RTM chat client process 312 is a Telnet HTML chat client process, and chat server process 264 includes a Telnet chat server process and a server-side process that enables communication between multiple chat client processes. In an alternative embodiment, the Telnet protocol and the compatible chat server process are replaced by the IRC protocol and an IRC chat server process, or by any other continuously open bi-directional connection protocols and compatible chat server processes. Commercial BBS services often execute proprietary chat server processes with the Telnet protocol, whereas UNIX environments often execute IRC server-side chat processes with the IRC protocol.

Telnet chat client process 312 outputs a message by outputting keystrokes either individually or in groups. In either case, Telnet chat client process 312 appends the keystroke(s) to a TCP/IP header and outputs the resulting packet to chat server process 264. Chat server process 264 receives the message and parses it in real time. If chat server process 264 detects a Telnet escape sequence, it processes the detected escape sequence.

If chat server process 264 is set to an HTML tag detect mode and detects a server-executable HTML tag, chat server process 264 suitably processes the detected HTML tag. If chat server process 264 does not detect a Telnet escape sequence and either is not in an HTML tag detect mode or does not detect a server-executable HTML tag, chat server process 264 outputs the message to all connected Telnet chat client processes or to a specified one (or ones) of connected Telnet chat client processes. If a connected Telnet chat client process is not HTML enabled, it displays HTML tags as they are received. Conversely, connected Telnet HTML-enabled chat client processes recognize and respond to HTML tags in received messages.

In an alternative embodiment, chat client process 312 is an IRC chat client process, and chat server process 264 includes an IRC chat server process and a server-side process that enables communication between multiple chat client processes. In such an alternative embodiment, the IRC chat client process outputs a message by forming an IRC packet, which includes the entire series of keystrokes preceding a carriage return. The IRC chat client process either appends the IRC packet to a TCP/IP header or, in some cases, subdivides the IRC packet into sub-packets and appends each sub-packet to a TCP/IP header. Then, the IRC chat client process outputs the resulting TCP/IP packet to the IRC chat server process. The IRC chat server process receives the TCP/IP packet and parses it in real time, including processing the TCP/IP header and the appended IRC packet(s) in response thereto.

In processing received messages that contain HTML tags, Telnet chat client process 312 parses the received message to distinguish between HTML tags and characters to be displayed. If chat client process 312 detects a client-executable HTML tag, client 102 suitably processes the tag and then proceeds to process the remaining portion of the received message in response thereto, so that the received message is displayed within the client's chat window (e.g., chat window 206). If chat client process 312 does not detect a client-executable HTML tag, client 102 proceeds directly to process the received message, so that the received message is displayed within the client's chat window. Telnet chat client process 312 either continues processing received messages and resumes parsing or idles if no message is received or scheduled for output.

A Telnet connection is terminated by either the chat client process or the chat server process. Termination is achieved by releasing the socket for the connection, in a manner well known in the art.

For supporting hyperlinks in a message session among RTM chat client processes, the bi-directional arrow between RTM chat client process 312 and real time chat server process 264 represents a bi-directional TCP/IP real time protocol communications channel. The bi-directional arrow between Web browser process 314 and HTTP Web server process 266 represents a one way TCP/IP HTTP (transactional) protocol communications channel.

In response to a suitable request by user 120, RTM chat client process 312 forms a message that includes an embedded hyperlink and outputs the message through the real time chat server process 264 to RTM chat client processes of one or more of client processes 304, 306 and 308. Under some circumstances, real time chat server process 264 responds to the embedded hyperlink although, the real time chat server process 264 primarily outputs the message to RTM chat client processes of one or more of client processes 304, 306 and 308. Chat server process 264 may also echo the message back to RTM chat client process 312.

In response to receiving (from chat server process 264) a chat message that includes an embedded hyperlink, chat client process 312 outputs a request to Web browser process 314. In response to such a request, Web browser process 314 establishes an HTTP connection to Web server process 266 and reads a Web page by accessing the URL associated with the embedded hyperlink. Preferably, chat client process 312 outputs such a request to Web browser process 314 using a suitable local communications protocol, such as the DDE protocol which is standard in many operating systems such as the Microsoft® Windows® Version 3.1 operating system and the Microsoft® Windows® 95 operating system. Plug-in technologies, ActiveX technologies, and Java technologies are examples of alternative protocols and methods, suitable for RTM chat client process 312 to use in outputting such a request to Web browser process 314. Other local communications protocols are suitable as well. In an alternative embodiment, chat client process 312 is internal to Web browser process 4522.

If Web browser process 314 is inactive (e.g., if client computer 132 is not already executing Web browser process 314), RTM chat client process 312 outputs a request to activate Web browser process 314 by using the URL associated with the embedded hyperlink as an instruction. In response to the request from chat client process 312, Web browser process 314 establishes a TCP/IP connection with HTTP Web server process 266, and Web browser process 314 outputs (to HTTP Web server process 266) a request for a Web page by outputting the URL associated with the embedded hyperlink. HTTP Web server process 266 responds to such a request by obtaining the requested Web page and outputting it to Web browser process 314.

After HTTP Web server process 266 outputs the requested Web page to Web browser process 314, the TCP/IP connection between Web browser process 314 and HTTP Web server process 266 is terminated. Meanwhile, the bi-directional TCP/IP real time protocol communications channel between RTM chat client process 312 and client subprocess object 316 (of real time chat server process 264) remains open if chat client process 312 is continuing to join (e.g. participate in) the message session. Likewise, the bi-directional TCP/IP real time protocol communications channels between the RTM chat client processes of other client processes (e.g., client process 264) and their respective associated client subprocess objects (e.g., client subprocess object 318), remain open if such chat client processes are continuing to join the message session.

Although an illustrative embodiment and its advantages have been described in detail hereinabove, they have been described as example and not limitation. Various changes, substitutions and alterations can be made in the illustrative embodiment without departing from the breadth, scope and spirit of the claims.

What is claimed is:

1. A method for coordinating a plurality of communications in a plurality of media in an information processing system, comprising:
communicating between a user node and each of a plurality of media servers directly and not through other of said media servers, wherein each of the media servers communicates in a different one of the plurality of the media; and
in response to control communications between one of the media servers and the user node, the one media server controlling the communicating between the user node and the plurality of the media servers to coordinate presentation of communications in the plurality of the media at the user node.

2. The method of claim 1 wherein:
coordinating comprises
in response to control communications between a chat server and the user node, the chat server controlling the communicating between the user node and the plurality of the media servers.

3. The method of claim 2 wherein:
communicating comprises
the user node communicating with the chat server and a streaming media server.

4. The method of claim 2 wherein:
communicating comprises
the user node communicating with the chat server, a streaming media server, and a web server.

5. The method of claim 1 wherein:
controlling comprises
the one media server receiving control communications from a user of the user node; and
in response, the one media server controlling the communicating between the user node and the plurality of the media servers to coordinate the presentation of the communications in the plurality of the media to the user.

6. The method of claim 1 wherein:
controlling comprises
passing control communications between the one media server and a client of the one media server in the user node to coordinate the presentation of the communications in the plurality of the media at the user node; and
cooperating between the one media server and the client of the one media server to present communications in the medium of the one media server at the user node.

7. The method of claim 6 wherein:
passing control communications comprises
selecting communications at the user node; and
passing the control communications between the one media server and the client of the one media server to cause only the selected communications to be presented at the user node.

8. The method of claim 6 wherein:
passing control communications comprises
selecting media at the user node at a time; and
passing the control communications between the one media server and the client of the media server to cause communications in the selected media to be presented at the user node at the time.

9. The method of claim 6 wherein:
passing control communications comprises
the client of the one media server receiving control signals from a user of the user node; and
in response, the client of the one media server passing the control communications between the client and the one media server to coordinate presentation of the communications in the plurality of the media to the user.

10. The method of claim 1 wherein:
communicating comprises
communicating between each media server and that media server's own corresponding client in the user node to present the communications in the plurality of the media at the user node; and
coordinating comprises
the client of the one media server and the clients of other said media servers passing control communications between them to coordinate the presentation of the communications in the plurality of the media at the user node;
the client of the one media server and the one media server passing the control communications between them to coordinate the presentation of the communications in the plurality of the media at the user node;
the client of the one media server and the one media server cooperating to present communications in the medium of the one media server at the user node; and
the one media server controlling communicating between others of the media servers and their corresponding clients to coordinate the presentation of the communications in the plurality of the media at the user node.

11. The method of claim 1 wherein:
communicating comprises
communicating between each of the media servers and each of a plurality of user nodes in the different one of the plurality of the media directly and not through another of said media servers; and
coordinating comprises
in response to control communications between the one media server and the clients of the one media server on the plurality of the user nodes, the one media server controlling the communicating between the plurality of the user nodes and the plurality of the media servers to coordinate presentation of the communications in the plurality of the media at each of the plurality of the user nodes.

12. The method of claim 11 wherein:
communicating between each of the media servers and each of a plurality of user nodes comprises
originating the communications in at least some of the media at some of the user nodes.

13. The method of claim 11 wherein:
communicating between each of the media servers and each of a plurality of user nodes comprises
originating the communications in at least some of the media at some of the user nodes; and
presenting the originated communications at others of the user nodes.

14. The method of claim 11 wherein:
the one media server controlling the communicating between the plurality of the user nodes and the plurality of the media servers comprises
the one media server coordinating the presentation of the communications in the plurality of the media independently of each of multiple ones of the plurality of the user nodes.

15. The method of claim 11 wherein:

the one media server controlling the communicating between the plurality of the user nodes and the plurality of the media servers comprises the one media server coordinating the presentation of the communications in the plurality of the media jointly at multiple ones of the plurality of the user nodes.

16. A system for coordinating a plurality of communications in a plurality of media in an information processing system, comprising:

a plurality of media servers each for communicating in a different one of the plurality of the media with a user node directly and not through another of said media servers; and one of the media servers being responsive to control communications between the one media server and the user node for controlling the communicating between the user node and the plurality of the media servers to coordinate presentation of communications in the plurality of the media at the user node.

17. The system of claim 16 wherein:

the one media server is a chat server.

18. The system of claim 17 wherein:

another of the media servers is a streaming media server.

19. The system of claim 18 wherein:

yet another of the media servers is a web server.

20. The system of claim 16 wherein:

the one media server controls the communicating in the plurality of the media in response to control communications received from a user of the user node to coordinate presentation of the communications in the plurality of the media to the user.

21. The system of claim 16 further comprising:

a client of the one media server in the user node, the client and the one media server passing control communications between them to coordinate the presentation of the communications in the plurality of the media at the user node and cooperating to present communications in the medium of the one media server at the user node.

22. The system of claim 21 wherein:

the client of the one media server and the one media server pass the control communications to cause only communications selected at the user node to be presented at the user node.

23. The system of claim 21 wherein:

the client of the one media server and the one media server pass the control communications to cause communications in media selected at the user node to be presented at the user node at a time selected at the user node.

24. The system of claim 21 wherein:

the client of the one media server responds to control signals received from a user of the user node by passing the control communications between the client and the one media server to coordinate presentation of the communications in the plurality of the media to the user.

25. The system of claim 16 further comprising:

a corresponding client for each of the media servers in the user node, the client of the one media server and the clients of the other media servers passing control communications between them to coordinate the presentation of the communications in the plurality of the media at the user node; wherein the client of the one media server and the one media server pass the control communications between them to coordinate the presentation of the communications in the plurality of the media at the user node, and cooperate to present communications in the medium of the one media server at the user node; and the one media server controlling communicating between the others of the media servers and their corresponding clients to coordinate the presentation of the communications in the plurality of the media at the user node.

26. The system of claim 16 wherein:

each of the plurality of the media servers communicates in the different one of the plurality of the media with a plurality of user nodes directly and not through another of said media servers; and the one media server is responsive to control communications between the one media server and the plurality of the user nodes for controlling the communicating between the plurality of the user nodes and the plurality of the media servers to coordinate presentation of the communications in the plurality of the media at each of the plurality of the user nodes.

27. The system of claim 26 wherein:

the communications in at least some of the media originate at some of the user nodes.

28. The system of claim 26 wherein:

the communications in at least some of the media originate at some of the user nodes and are presented at others of the user nodes.

29. The system of claim 26 wherein:

the one media server coordinates the presentation of the communications in the plurality of the media independently at each of multiple ones of the plurality of the user nodes.

30. The system of claim 26 wherein:

the one media server coordinates the presentation of the communications in the plurality of the media jointly at multiple ones of the plurality of the user nodes.

31. An interface for coordinating a plurality of communications in a plurality of media at a user node of an information processing system, comprising:

a plurality of clients in the user node, each for communicating in a different one of a plurality of media with a corresponding one of a plurality of media servers directly and not through another of said media servers, and for presenting communications in the plurality of the media at the user node; and one of the clients passing control communications with its corresponding media server for causing the corresponding media server to control the communicating between the plurality of the clients and the plurality of the media servers to coordinate the presenting of the communications in the plurality of the media by the plurality of the clients at the user node.

32. The interface of claim 31 wherein:

the one client is a chat client.

33. The interface of claim 32 wherein:

another of the clients is a streaming media client.

34. The interface of claim 33 wherein:

yet another of the clients is a web browser.

35. The interface of claim 31 wherein:

the one client passes the control communications with the corresponding media server in response to control signals received from a user of the user node, for causing the corresponding media server to control the communicating between the plurality of the clients and the plurality of the media servers to coordinate presentation of the communications in the plurality of the media to the user and causing the corresponding media server to provide communications in the medium of the corresponding media server to the one client for presentation to the user.

36. The interface of claim 35 wherein:
the one client passes the control communications to inform the corresponding media server of the user's selection of communications in any of the plurality of the media for the presentation to the user.

37. The interface of claim 35 wherein:
the client passes the control communications to inform the corresponding media server of the user's selection of communications in any of the plurality of media for the presentation to the user at a particular time.

38. The interface of claim 31 wherein:
the one client and other said clients further pass control communications between them to coordinate the presentation of the communications in the plurality of the media at the user node; and
the one client cooperates with the corresponding media server to present communications in the medium of the corresponding media server at the user node.

39. The interface of claim 31 for an information processing system comprising a plurality of the user nodes, wherein:
the communications in at least some of the media presented at said user node originate at others of the user nodes.

40. The interface of claim 31 for an information processing system comprising a plurality of the user nodes wherein:
communications in at least some of the media originate at said user node and are presented at others of the user nodes.

41. The interface of claim 31 for an information processing system comprising a plurality of the user nodes wherein:
the one client causes the corresponding media server to coordinate the presentation of the communications in the plurality of the media at said user node independently of presentation of the communications in the plurality of the media at others of the user nodes.

42. The interface of claim 31 for an information processing system comprising a plurality of the user nodes wherein:
the one client causes the corresponding media server to coordinate the presentation of the communications in the plurality of the media at said user node jointly with presentation of the communications in the plurality of the media at others of the user nodes.

* * * * *

UNITED STATES PATENT AND TRADEMARK OFFICE
CERTIFICATE OF CORRECTION

PATENT NO. : 7,165,213 B1  
APPLICATION NO. : 09/187895  
DATED : January 16, 2007  
INVENTOR(S) : Andrew T. Busey Page 1 of 1

It is certified that error appears in the above-identified patent and that said Letters Patent is hereby corrected as shown below:

Title Page, Related U.S. Application Data located at (63), "abandoned" should read -- Pat. No. 7,263,526 --.

Title Page, Related U.S. Application Data located at (63), "08/722,898, filed on Sep. 27, 1996, now Pat. No. 5,764,916" should read -- 08/741,470, filed on Oct. 30, 1996, now Pat. No. 6,785,708 --.

In the Specification:

Column 1, line 8, "abandoned" should read -- Pat. No. 7,263,526 --.

Column 1, lines 9-10, "08/722,898, filed on Sep. 27, 1996, now Pat. No. 5,764,916" should read -- 08/741,470, filed on Oct. 30, 1996, now Pat. No. 6,785,708 --.

Signed and Sealed this  
Eleventh Day of June, 2013

Teresa Stanek Rea  
*Acting Director of the United States Patent and Trademark Office*